US012656368B2

(12) United States Patent
Reed et al.

(10) Patent No.: US 12,656,368 B2
(45) Date of Patent: *Jun. 16, 2026

(54) LIDAR MEASUREMENT OF METHANE GAS FLOW IN COMPLEX WIND

(71) Applicant: QLM Technology Ltd, Paignton (GB)

(72) Inventors: Murray Keith Reed, Paignton (GB); Xiao Ai, Bristol (GB)

(73) Assignee: QLM Technology Ltd, Paignton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/288,726

(22) Filed: Aug. 1, 2025

(65) Prior Publication Data

US 2025/0355017 A1 Nov. 20, 2025

Related U.S. Application Data

(63) Continuation of application No. 18/817,092, filed on Aug. 27, 2024, now Pat. No. 12,411,153, which is a
(Continued)

(30) Foreign Application Priority Data

Apr. 6, 2022 (GB) ...................................... 2205038

(51) Int. Cl.
*G01P 5/26* (2006.01)
*G01M 3/18* (2006.01)
(Continued)

(52) U.S. Cl.
CPC ............... *G01P 5/26* (2013.01); *G01M 3/186* (2013.01); *G01P 5/02* (2013.01); *G01S 7/4808* (2013.01); *G01S 17/89* (2013.01)

(58) Field of Classification Search
CPC .......... G01S 17/89; G01M 3/186; G01P 5/26; G01P 5/02
(Continued)

(56) References Cited

U.S. PATENT DOCUMENTS 8,010,300 B1 * 8/2011 Stearns ................... G01S 17/95
356/326
8,379,208 B1 * 2/2013 Simmons .................. G01J 3/42
356/432
(Continued)

FOREIGN PATENT DOCUMENTS

WO WO-2020150388 A1 * 7/2020 ............. B64D 45/00

*Primary Examiner* — Nathaniel T Woodward
(74) *Attorney, Agent, or Firm* — Haynes Beffel & Wolfeld LLP; Andrew L. Dunlap; Franklin M. Schellenberg

(57) ABSTRACT

Methods and systems for detecting and measuring gas flow are disclosed in which lidar distance information, acquired during the detection of gas using a lidar sensor, is used together with local wind data to determine a rate of flow for the detected gas. The local wind data, which may comprise one or more vectors or a 3D wind model, may be determined based on prevailing wind data and the lidar distance information, and can use computational fluid dynamics (CFD) models to determine the wind velocity through 3D structures identified using the lidar sensor. The detection of gas flow using the disclosed technology may be particularly useful for the remote detection and quantification of leaks from natural gas (methane) wells and pipelines to locate, quantify and map fugitive emissions.

20 Claims, 16 Drawing Sheets

Related U.S. Application Data continuation of application No. 18/296,096, filed on Apr. 5, 2023, now Pat. No. 12,111,335.

(51) Int. Cl.
| | |
|---|---|
| G01P 5/02 | (2006.01) |
| G01S 7/48 | (2006.01) |
| G01S 17/89 | (2020.01) |

(58) Field of Classification Search
USPC ........................................................ 73/170.11
See application file for complete search history.

(56) References Cited

U.S. PATENT DOCUMENTS

| | | | | |
|---|---|---|---|---|
| 10,060,942 | B2 * | 8/2018 | Burba ................ | G01N 33/0067 |
| 10,094,773 | B2 * | 10/2018 | Myshak ................ | G01J 3/0208 |
| 2010/0131207 | A1 * | 5/2010 | Lippert ................... | G01S 17/95 |
| | | | | 702/49 |
| 2017/0088261 | A1 * | 3/2017 | Sequeira ............. | G01S 13/0209 |

* cited by examiner

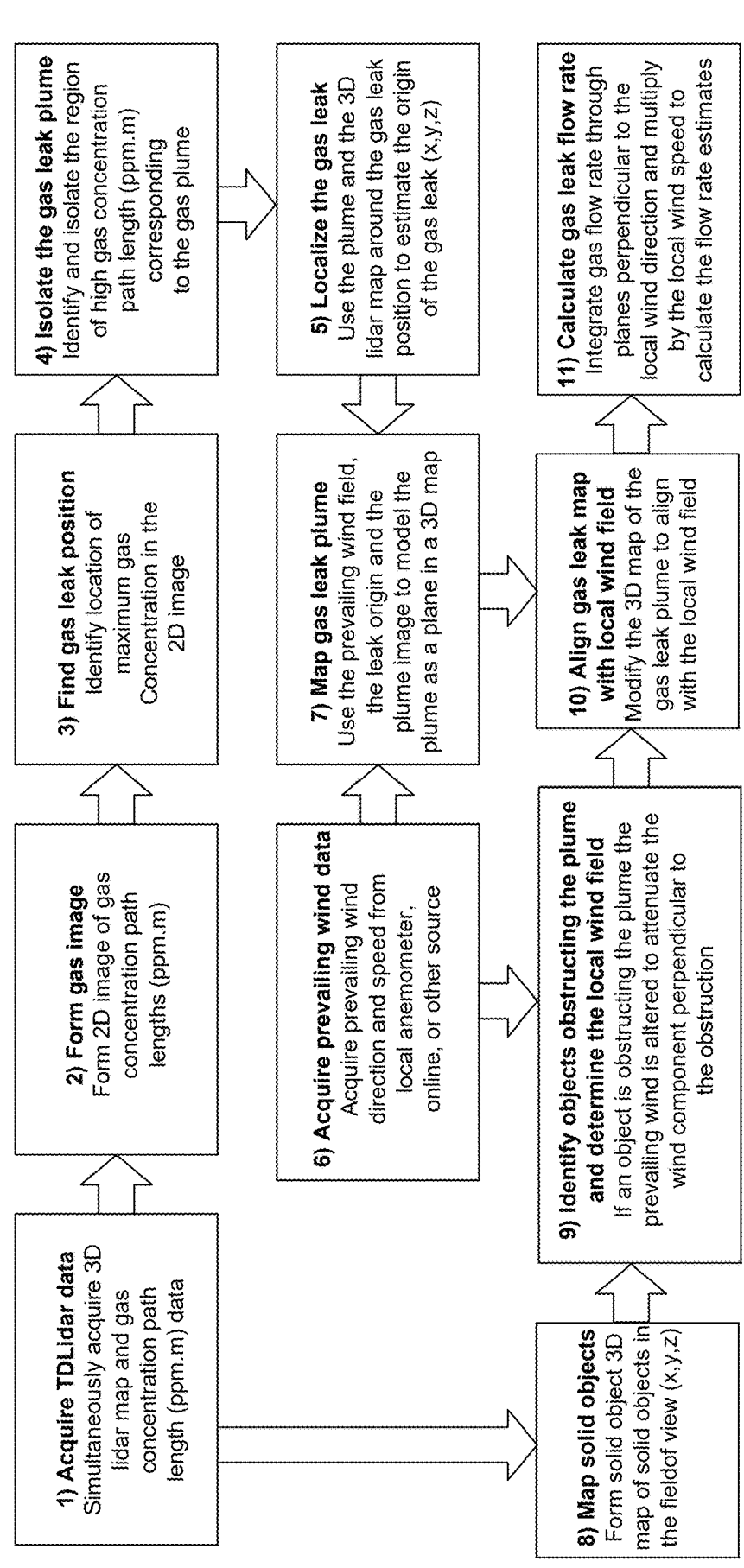

1) Acquire TDLidar data
Simultaneously acquire 3D lidar map and gas concentration path length (ppm.m) data

2) Form gas image
Form 2D image of gas concentration path lengths (ppm.m)

3) Find gas leak position
Identify location of maximum gas Concentration in the 2D image

4) Isolate the gas leak plume
Identify and isolate the region of high gas concentration path length (ppm.m) corresponding to the gas plume

5) Localize the gas leak
Use the plume and the 3D lidar map around the gas leak position to estimate the origin of the gas leak (x,y,z)

6) Acquire prevailing wind data
Acquire prevailing wind direction and speed from local anemometer, online, or other source

7) Map gas leak plume
Use the prevailing wind field, the leak origin and the plume image to model the plume as a plane in a 3D map

8) Map solid objects
Form solid object 3D map of solid objects in the field of view (x,y,z)

9) Identify objects obstructing the plume and determine the local wind field
If an object is obstructing the plume the prevailing wind is altered to attenuate the wind component perpendicular to the obstruction

10) Align gas leak map with local wind field
Modify the 3D map of the gas leak plume to align with the local wind field

11) Calculate gas leak flow rate
Integrate gas flow rate through planes perpendicular to the local wind direction and multiply by the local wind speed to calculate the flow rate estimates

FIG. 1

CH₄ [ppm.m]

CH₄ overlay

Sensor point of view

Birds-eye view 3D plot of plume

Prevailing
wind direction

Range [m]

801

803

Horizontal flow integrated vertically (L/min)

Horizontal position (m)

LIDAR MEASUREMENT OF METHANE GAS FLOW IN COMPLEX WIND

CROSS-REFERENCE TO RELATED APPLICATIONS

The present application is a continuation of U.S. patent application Ser. No. 18/817,092, titled "ACCURATE MEASUREMENT OF METHANE GAS LEAK FLOW RATE" (filed on Aug. 27, 2024), which is a continuation of U.S. patent application Ser. No. 18/296,096, titled "MEASUREMENT OF GAS FLOW RATE" (filed on Apr. 5, 2023), which claims the benefit of priority to United Kingdom Patent Application No. GB2205038.9, titled "MEASUREMENT OF GAS FLOW RATE" (filed on Apr. 6, 2022), which are incorporated herein by reference in their entirety for all purposes.

FIELD OF THE INVENTION

The present invention is in the field of detection and measurement of gas flow rate. It is particularly but not exclusively suitable for measuring flow of gas from sources such as leakage from containers.

BACKGROUND

High-sensitivity, low-power, remote gas detection and imaging systems are being developed based on novel semiconductor infrared lasers, single-photon detectors and quantum technology. An example application for this technology is the remote detection and quantification of leaks from natural gas wells and pipelines to locate, quantify and map fugitive emissions.

A gas lidar camera or sensor suitable for use detection of gas leaks is shown for example in GB2586075A. A camera of this kind can be used to obtain gas concentration pathlength data. The gas concentration pathlength is a standard term in spectroscopy and is the product of gas concentration and laser path length from sensor to reflective structure, both of which may be determined by a gas lidar camera. In the simplest case of a uniform concentration—say 2 ppm—over a distance—say 100 m—the gas concentration pathlength would be 200 ppm·m. More complicated distributions need to be added up step-wise but have the same units. For SI units ppm may be converted to $g/m^3$ so the gas concentration pathlength is in $g/m^2$. Gas leaks are a major concern for safety and environmental impact if the gas is hazardous, explosive or a greenhouse gas. These concerns scale directly with the size of the leak and the acceptable leak size often has a critical threshold beyond which action must be taken quickly. For these reasons it is important to not only identify gas leaks but to accurately quantify them as well.

Escaping gas from a pipe or a container will typically quickly form a local cloud that spreads from its point of origin forming a plume. The gas in the plume will move in the prevailing wind direction and at the local wind speed. If the wind speed is high the gas will quickly spread and disperse, and the measured gas concentration will be lower. If the wind speed is low then the gas will remain concentrated for longer and the measured concentration will be higher.

Therefore, there is a desire to accurately quantify leakage of gas in a manner that takes account of this wind speed.

One approach to quantifying gas leakage that assumes a fixed constant wind speed is disclosed in S. Yang et al., "Natural Gas Fugitive Leak Detection Using an Unmanned Aerial Vehicle: Measurement System Description and Mass Balance Approach," Atmosphere (Basel) vol. 9, no. 10, p. 383, October 2018 [www.mdpi.com/2073-4433/9/10/383].

Some proposals have been made to base measurements on sampling gas around an area with a drone. Examples are shown in Sensitive Drone Mapping of Methane Emissions without the Need for Supplementary Ground-Based Measurements Magnus Galfalk, Soren Nilsson Piledal, and David Bastviken, ACS Earth Space Chem. 2021, 5, 2668-2676 [www.diva-portal.org/smash/get/diva2:1613751/FULLTEXT01.pdf], and Jacob T. Shaw et al., Methods for quantifying methane emissions using unmanned aerial vehicles: a review, Phil. Trans. R. Soc. A 379:20200450 [royalsocietypublishing.org/doi/10.1098/rsta.2020.0450].

BRIEF SUMMARY

In the following, methods and apparatus for detecting and measuring gas flow are disclosed in which lidar distance information, acquired during the detection of gas using a lidar sensor, is used together with prevailing wind data to determine local wind data for the leak location. This local wind data, which may comprise one or more vectors or a 3D wind model, is used in the determination of flow rate. In other words, the determination does not rely on prevailing wind data alone. It will be appreciated that the determined local wind data may not be accurate and may be an approximate measurement of actual local wind, but may nevertheless improve the determination of gas flow. The term "determination" as used here should be construed to include approximation or estimation.

Thus in one aspect there is provided in the following a method of detecting and measuring a gas flow, the method comprising: using a lidar sensor to detect the gas and to obtain distance information relating to solid structures in the sensor field of view; determining a location of the detected gas; acquiring prevailing wind data for the location of the detected gas; determining local wind data for the location of the detected gas based on the prevailing wind data and the lidar distance information; and determining the rate of flow of the gas using the local wind data.

Some of the methods described here may be performed using existing apparatus, configured to receive gas detection data and prevailing wind data to determine gas flow rate. Therefore in another aspect there is provided a method of detecting and measuring a gas flow, the method comprising: receiving gas detection data from a lidar sensor, wherein the data includes distance information relating to solid structures in the sensor field of view; determining a location of the detected gas; receiving prevailing wind data for the location the detected gas; determining local wind data for the location of the source of the gas based on the prevailing wind data and the lidar distance information; and determining the rate of flow of the gas using the lidar gas detection data and the local wind data.

The determination of the location of the detected gas may comprise determining the location of the source of the gas. Then the determined flow rate may be the rate of flow of the gas from the source. The prevailing wind data may apply to a region including the location of the detected gas or its source. For example it may be obtained from one or more sensors close to the location of the gas or its source.

There is also provided a computer readable medium comprising instructions which, when implemented in a processor in a computing system, cause the system to implement a method as described here.

It will be appreciated that operations such as determination and measurement may result in an estimate or prediction of a parameter or quantity and therefore in the following the terms "determination" and "measurement" are intended to include "estimation" and "prediction".

BRIEF DESCRIPTION OF THE DRAWINGS

Embodiments of the invention will be described, by way of example, with reference to the following drawings, in which:

FIG. 1 is a flow chart showing a method of detecting and measuring a gas flow according to some embodiments of the invention.

Figure 2:
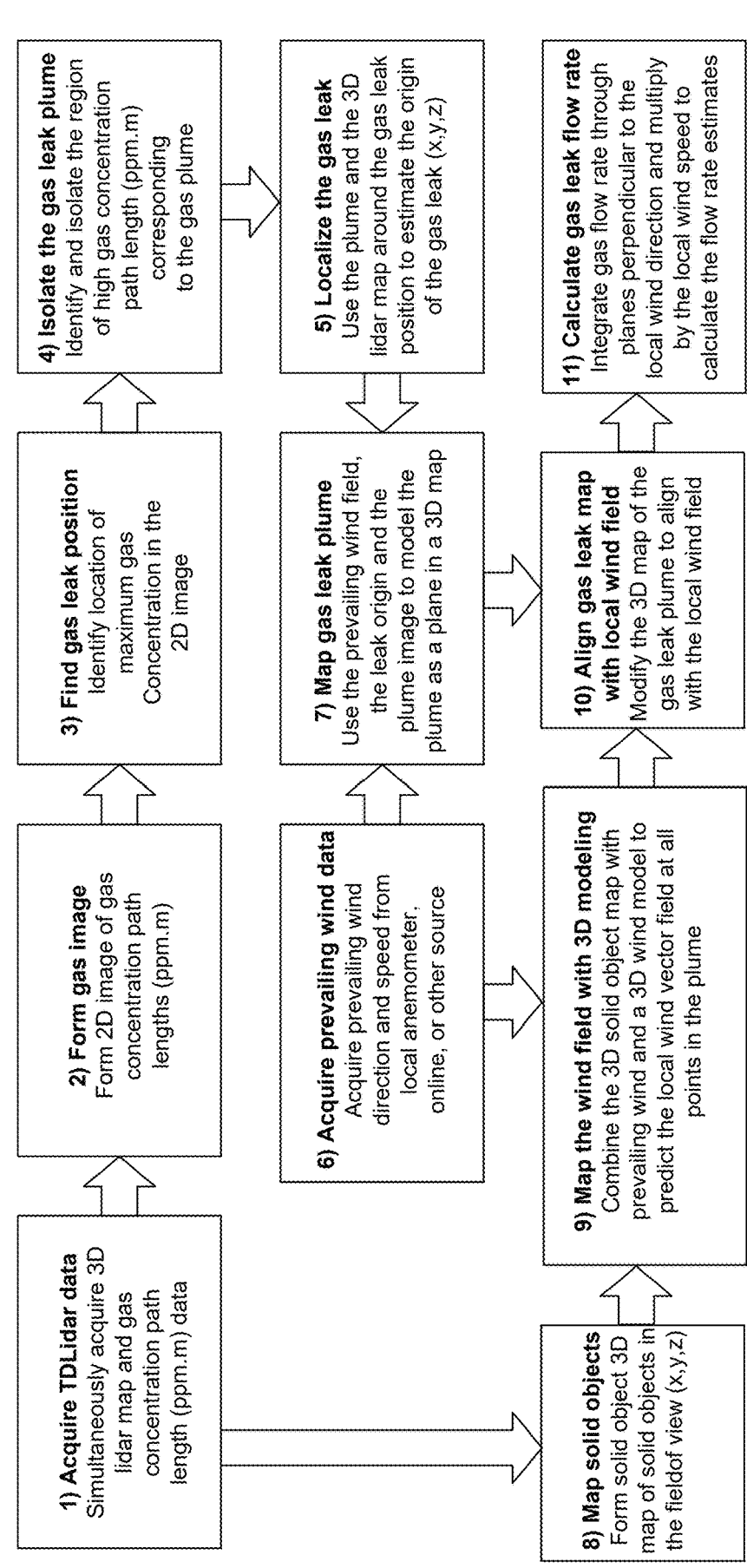
FIG. 2 is a flow chart showing an alternative method of detecting and measuring a gas flow according to some embodiments of the invention.

Common reference numerals are used throughout the figures to indicate similar features.

DETAILED DESCRIPTION

FIG. 1 is a flow chart showing a method of detecting and measuring a gas flow according to some embodiments of the invention. The method begins with detecting the gas in an environment, for example an open air environment, using a lidar sensor. In the method of FIG. 1, this is achieved using a tunable diode lidar "TDLidar" sensor but other lidar sensors may be used. This sensor may be used to obtain gas detection data, for example to acquire gas concentration pathlengths in a manner known in the art. The presence of a gas is identified from absorption of the emitted radiation by the gas. In order to determine gas concentration pathlength the sensor data contains distance information relating to structures in the sensor field of view from which the lidar radiation has been reflected, usually solid structures such as for example a container or pipeline from which the gas is leaking. Such distance information as is available from TDLidar is usually used only in the determination of pathlengths as described in the background above since it is the gas cloud and not the underlying solid structure which is of interest. In the methods described here this distance information, which is necessarily acquired simultaneously with information relating to gas concentration, is used in the determination of local wind data which in turn is used to provide improved measurements of flow rate.

In the methods described here, distance information obtained using a lidar system is used to obtain 3D structure information, for example in the form of a 3D lidar map. Then, computational fluid dynamics modelling or similar or simpler methods are used to determine the wind velocity through the 3D structure, i.e. the local wind data. This can allow a more accurate calculation of local wind velocities and hence more accurate flow rate prediction. It should be noted that some improvement in flow rate determination can be achieved without the need for complete 3D structure information or a 3D map.

Referring again to FIG. 1, after the gas has been located in operation 1, a location of the gas, for example source such as a leak location, is determined. In the method of FIG. 1 this is achieved via a series of operations 2-5 to be explained further below.

Data relating to the prevailing wind is acquired for the location of the gas, for example but not necessarily the location of the source, at operation 6. This may be obtained for example from a third party source of meteorological information such as official weather reports, or from an anemometer in the region, on site metrological data such as might be available at oil and gas facilities, or from any other suitable source. Thus the prevailing wind data may be for a region including the location of the detected gas. This data will typically be in the form of, or used to generate, a prevailing wind vector. It will be appreciated that the prevailing wind data may be acquired before or after the location of the gas, for example the source of the gas, has been determined. Further, the prevailing wind data may be updated regularly, for example anywhere between every second and every few minutes depending on what information sources, e.g. what sensors, are available. In the methods described in the following, the location of the source of the gas is determined. However, the determination of flow rate can be used not only where the source location is determined but for any location where gas is visible by the lidar sensor. This is particularly the case when for example the source location is obscured by solid structure.

Figure 3:
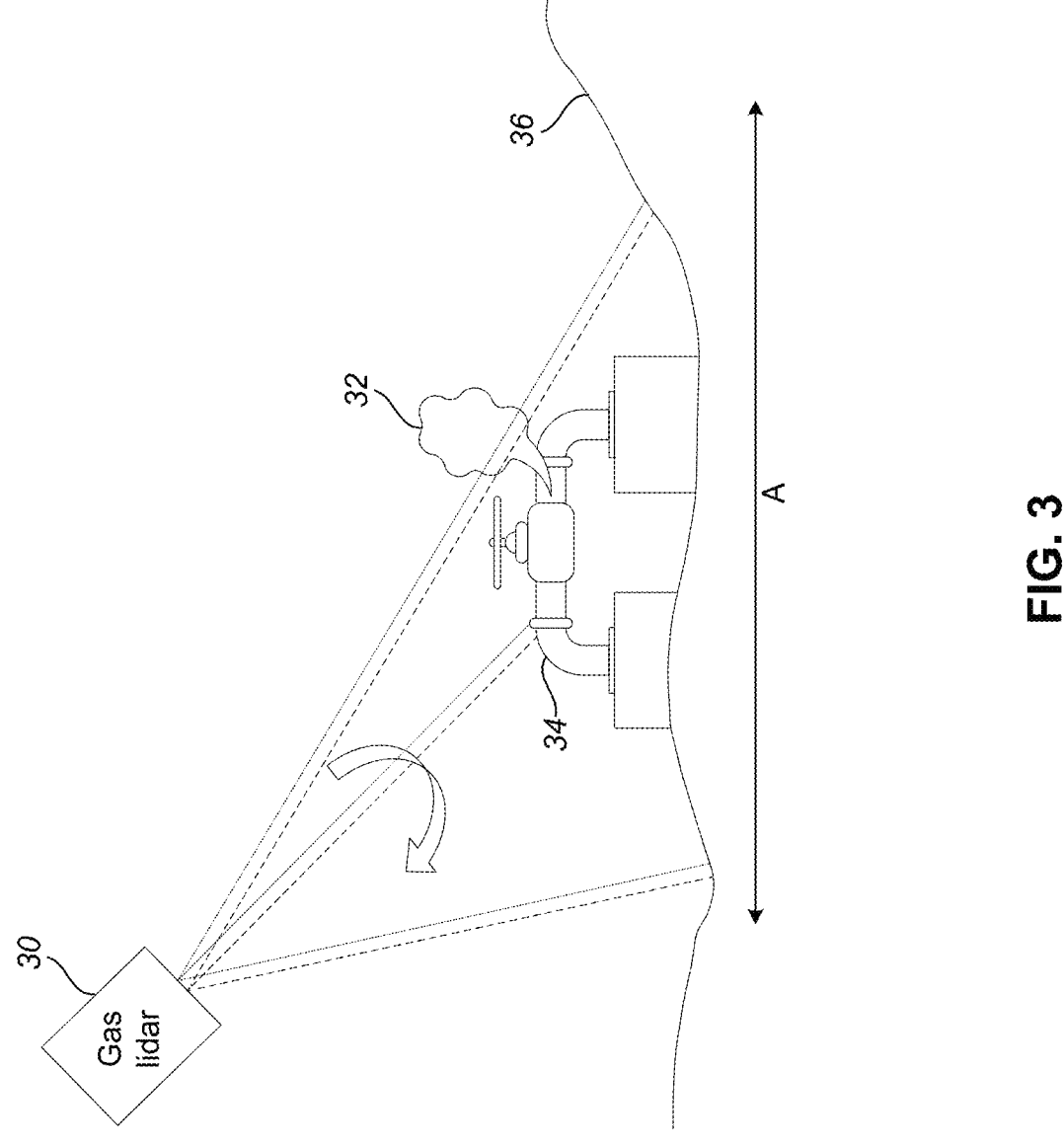
FIG. 3 is a schematic diagram showing the use of a gas lidar sensor that simultaneously measures both distance information and gas concentration data to acquire a 3D map of the target area.

FIG. 3 shows schematically TDLidar apparatus 30 is positioned on an aerial platform (not shown) to scan a target area A on the ground 36. A gas plume 32 is located above part of the area A escaping from a pipeline 34. The lidar apparatus may be located on a fixed platform to monitor a target area or may be carried on a drone or other suitable aerial platform. Typical ranges over which a TDlidar sensor could successfully detect a leak would be anywhere from 1 meter (or closer) to 250 meters. The limitation is the range of the laser sensing system (currently ~250 meters). The methods described here are not limited to TDlidar and other sensing apparatus might be able to detect leaks at greater distances. A TDlidar or other lidar gas detection apparatus might be used to autonomously look for leaks in a large facility. This might be achieved using a drone. Additionally or alternatively the sensor could be periodically rotated to monitor different areas and this could be done using a standard pan/tilt stage and mechanism.

An anemometer co-located with apparatus 30 might be used to obtain prevailing wind data which is assumed to be applicable to a region including the apparatus 30 and the location of the source of the gas. However, structures in the region of the leak, for example closer to the leak location than the apparatus 30, may result in the local wind, i.e. the wind at the leak location, being different from the prevailing wind.

The prevailing wind data and the lidar distance information are used to determine local wind data for the location of the source of the gas. This local wind data is used in the determination of the rate of flow of the gas from the source. One way in which this may be carried out is shown in operations 7-10 of FIG. 1, described further below.

FIG. 2 is a flow chart showing a method of detecting and measuring gas similar to FIG. 1. FIG. 2 differs from FIG. 1 in the manner in which the local wind data is determined.

In the method of FIG. 1, if it is found from the lidar distance information that an object is obstructing the flow of gas, the local wind data is determined by modifying the prevailing wind data in the region of the obstruction to attenuate any wind component in a direction perpendicular to the obstruction. This local wind data is then used in the determination of rate of flow of gas. If no object is found to be obstructing the flow of gas, the local wind data may be assumed to be the same as the prevailing wind data.

FIG. 2 shows a more complex method in which the lidar distance information together with the prevailing wind data is combined with a computational fluid dynamics model to generate local wind data in the form of a 3D wind model, which is then used in the determination of flow rate.

In both methods, if there is no structure obstructing the prevailing wind, the local wind data may be the same as the prevailing wind data. The prevailing and/or local wind data may be in the form of a single vector (magnitude and direction) or more complex data comprising a 3D vector model, both of which are examples of vector fields, or any other suitable data structure known to those skilled in the art.

Those skilled in the art will realise from these two examples that other methods of determining the local wind data and determining the flow rate are possible, using distance information obtained from the lidar sensor, for example of intermediate or greater complexity and possibly combining aspects of the methods of FIGS. 1 and 2.

It will be appreciated that any of the methods described here may be implemented as an algorithm, which may operate in a computer system comprised in lidar detection apparatus, or may operate on a separate computing device or system remote from apparatus acquiring gas detection data.

Details of operations 7-10 as shown in FIGS. 1 and 2 are described by way of example further below.

Referring back to operation 1 of FIGS. 1 and 2, the acquisition of lidar data to determine gas concentration path lengths is known in the art. For example, GB2586075A discloses a gas sensor using a combination of two laser technologies known as Single Photon Lidar and Tuneable Diode Laser Absorption Spectroscopy (TDLAS), which combination is abbreviated to "TDLidar". Here, output radiation from the laser device is modulated with a binary code. The lidar is scanned over a target area. Received scattered radiation is correlated with the transmitted output radiation and fitted to one or more measured absorption spectra to detect the presence, or concentration, of the gas.

In the methods shown in the figures, Lidar time of flight information obtained using the TDLidar apparatus, in other words lidar distance information, is used in the determination of gas flow rate. In the examples of FIGS. 1 and 2, at operation 1 this distance information is used to acquire a 3D map of the target area. An example is illustrated schematically in FIG. 3 where TDLidar apparatus 30 is positioned on an aerial platform (not shown) to scan a target area A on the ground 36. The scanning is shown exaggerated for the purpose of illustration. In practice the apparatus 30 would usually be stationary and a beam control mechanism in the apparatus 30 would operate to scan a laser beam over the area A. Thus the scanning defines the field of view of the sensor. A known TDlidar sensor might have a field of view of around 25 degrees. This may be sufficient to obtain measurement data for a plume without the need to move the sensor. A gas plume 32 is located above part of the area A escaping from a pipeline 34. Radiation output from the TDLidar apparatus 30 is absorbed by the gas plume 32 as it travels towards the ground 36 and is reflected back to the TDLidar apparatus 30. Distance information acquired by the TDLidar due to reflection of output radiation from the area A, either from the ground or from structures surrounding the source of the plume 32, is used to acquire the 3D map. Using apparatus of this kind, accurate leak flow estimates may be obtained with a single stationary measurement.

The TDlidar apparatus 30 may comprise an onboard computer configured to create the 3D map. Otherwise, data acquired by lidar apparatus could be uploaded to an external device such as a server for processing of the data and creation of the 3D map. The same applies to processing of other data acquired by the apparatus 30, it may be processed on board or remotely.

The location of the source of the gas is determined using data obtained by the lidar sensor. The location may be determined from gas concentration pathlength data, for example by identifying an area of the sensor field of view in which gas concentration pathlength exceeds a threshold, and determining the leak location from the sensor location and the lidar range from the sensor to the area.

This may be achieved in a number of ways, some of which are now described.

Figure 4B:
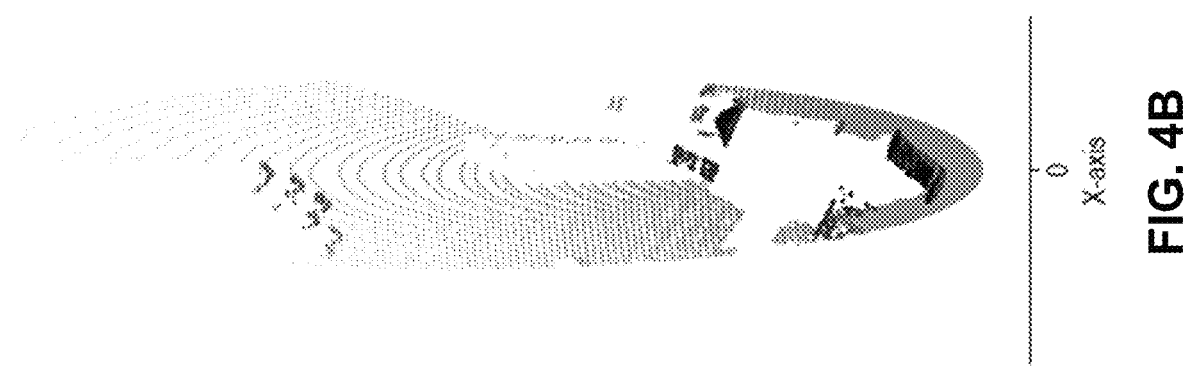
FIG. 4A and FIG. 4B show an example of a 3D point cloud which may be generated using data obtained from a lidar distance sensor.
Figure 4A:
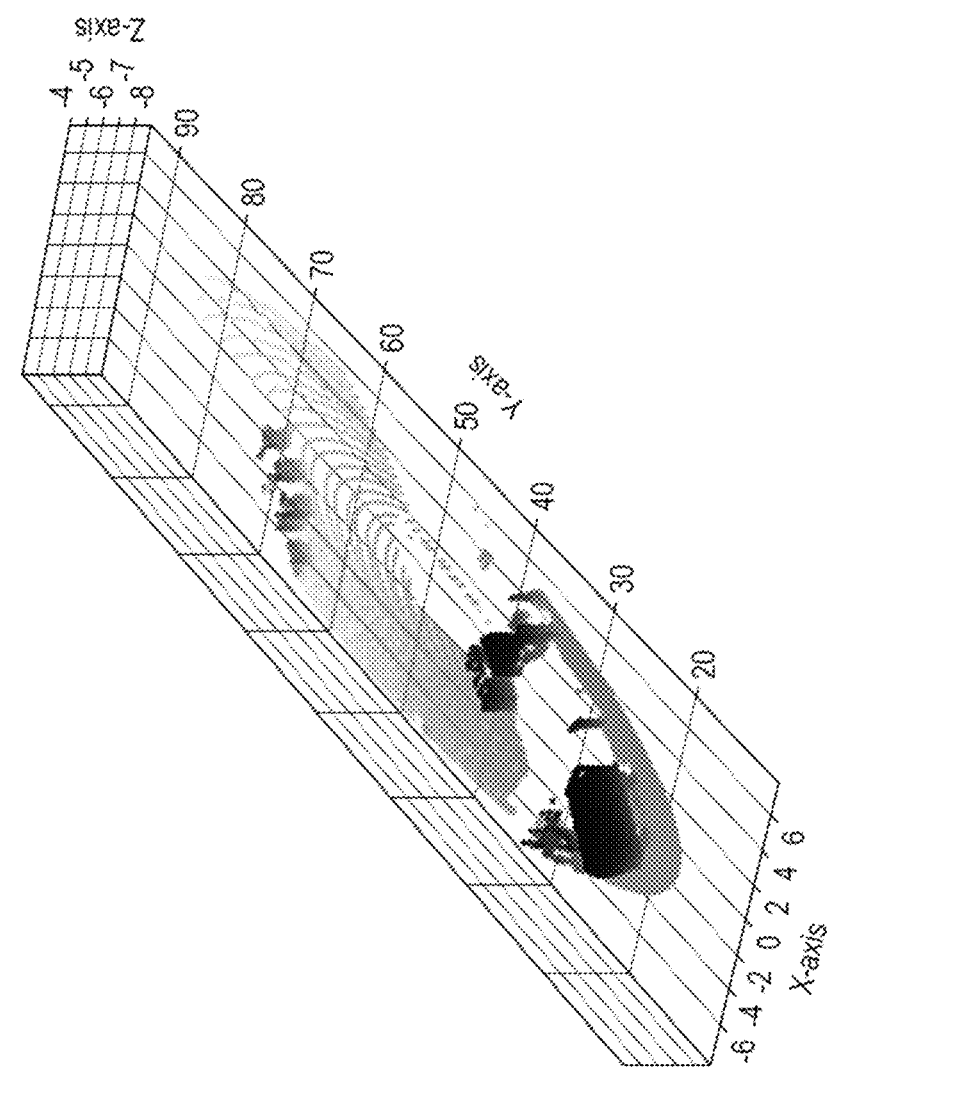

Data obtained from a lidar sensor may be used to generate what is known as a "3D point cloud", or 3D scatter plot, an example of which is shown in FIGS. 4A and 4B.

FIGS. 4A and 4B show a 3D point cloud in in perspective and plan views respectively. A 3D point cloud shows Lidar scattering off objects such as the ground or other solid objects or structures as shown in FIG. 3. The 3D point cloud additionally contains information relating to gas that may be present between the lidar apparatus and the objects. It may be similar to the 3D structure information or 3D map described previously which typically describes solid structures, additionally containing information relating to gas between the solid structures and the sensor. The point cloud consists of many data points. In an example point cloud, each point is defined by 3 spatial coordinates, $(x,y,z)$. Furthermore, each point has information about the gas concentration path length (ppm·m) encountered by the laser beam traversing the distance between the sensor and the scattering object, which may be obtained in a manner known in the art for example using apparatus as described in GB2586075A. Here we will refer to the gas concentration path length as 'c'. Also, each point has information about the amount of laser light that scattered off that object (i.e. the signal level). This parameter is referred to as 'i'.

So overall a point in the point cloud can be characterized by 5 numbers, x—meters y—meters z—meters c—gas ppm·m i—signal intensity (photon counts per second, cps).

Thus an example of a point cloud is a collection of many data points, each data point of the form: (x,y,z,c,i).

Figure 5A:
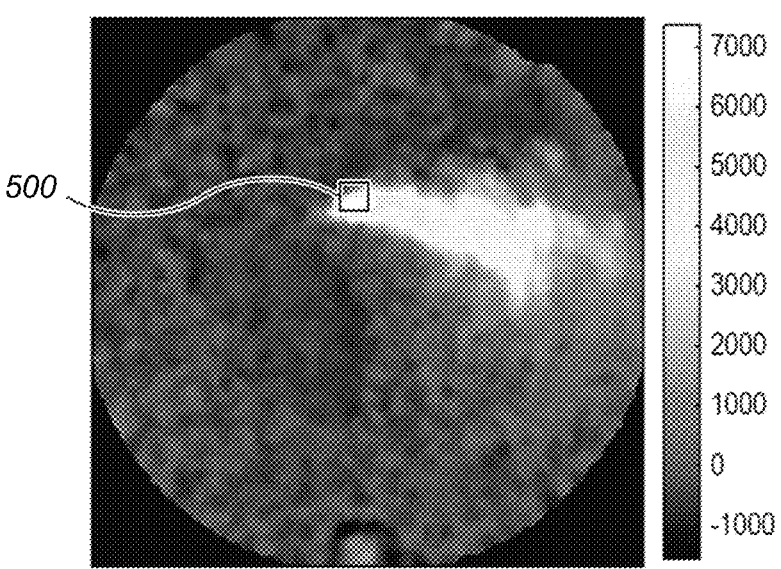
FIG. 5A and FIG. 5B show respectively a 2D image of gas concentration data and a 2D image of the gas concentration data overlaid on signal level data from a gas lidar sensor.
Figure 5B:
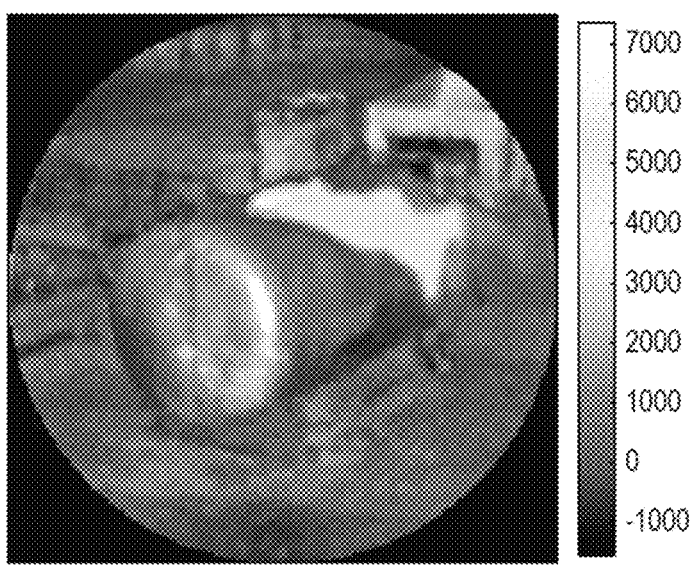

As well as the 3D point cloud way of viewing the data, 2D gas concentration pathlength images, can also be made, as indicated at operation 2 in FIGS. 1 and 2, examples of which are shown in FIGS. 5A and 5B.

This is a useful way of both visualizing and computationally processing the data. 2D images of the gas ppm·m can be made by taking the x, y, and c values of the 3D point cloud and interpolating them into a 2D grid to form a gas concentration path length image. 2D images of the signal level can be made by taking the x, y, and i values of the 3D point cloud and interpolating them into a 2D grid. The gas ppm·m image can be overlaid on the signal level image to help show where the gas leak is originating from on the structure.

FIG. 5A shows a 2D image of ppm·m data. This is calculated from the (x,y,c) data from a 3D point cloud of the kind shown in FIGS. 4A and 4B. Colour may be used to show the c (ppm·m) information, indicated in the figures in grayscale, while the x and y give the horizontal and vertical position. The location of the plume source may be automatically detected as explained further below, and is highlighted in the box 500.

FIG. 5B shows a 2D image of ppm·m data overlaid on signal level data. The signal level data is the amount of light (laser signal) that is returned to the sensor from each point in the scene. It does not contain distance information and therefore is not a 3D map. The signal level image (grey colormap) is generated from the (x,y,i) data from the point cloud. In the figure, for visualization the ppm·m image is made transparent for ppm·m values below a threshold, in this example 2000 ppm·m. This is done for visualization to show where the plume is and is not necessarily part of any algorithm used to measure gas flow.

The gas 'images', such as those shown in FIGS. 5A and 5B may be produced and displayed by the sensor and are 2D, in the sense that they can be used to measure the total amount of gas along the laser beam path, but cannot tell the range of the gas is along the laser path. The location of the gas may be estimated by finding the lidar distance to the closest object, e.g. identified from the distance information or 3D structure map, to the source of gas emission.

The methods described here use distance information obtained by a lidar sensor to determine local wind data. Some of the methods described in the following make use of a gas concentration pathlength image. However in such methods the image itself is not essential and some methods may use image data without generating a visual image.

It should be noted that the time taken to acquire data for a gas concentration pathlength image, e.g. the scan duration, using current TDlidar technology is in the region of 100 seconds or more, which is relatively long in the general field of image acquisition. The acquisition of a gas concentration path length image may comprise acquiring multiple gas concentration, and optionally path length, measurements for each point on the image during each scan. These multiple measurements may then be processed to provide a single measurement for each point, for example by a suitable averaging process.

In the methods described here, this lidar distance information, which is used to determine gas concentration, is also used to determine local wind data. It may be used to identify objects obstructing the flow of the plume. In some implementations a 3D map of objects in the field of view of the lidar sensor may be created for this purpose. Since each gas measurement, e.g. pmm·m, and each lidar distance measurement is acquired from the same light signal, the methods benefit from very good knowledge of exactly how far the light travelled through the gas. The methods provide information on exactly how much ambient gas the laser should have encountered, and any excess above that can be identified.

If separate sensors were used for the lidar and gas measurements, there would be less certainty as to how far the light that was used for gas measurement had travelled. This could be estimated by superimposing both data sets, but it would not be as accurate.

In order to measure the gas flow, a location of a source of the gas, or leak location, is determined. At operation 3 in the flows of FIGS. 1 and 2 a likely leak location for the purpose of the measurement is found in a 2D image, such as those shown in FIGS. 5A and 5B which map the ppm·m measurements. Other methods of determining a source or leak location may be used. Further, as noted above, the measurement may be performed using another location, for example if the source is not visible. A possible method for determining the likely location from an image comprises:

calculating expected noise level in the ppm·m readings by using the signal level of each ppm·m reading.

identifying data points where the ppm·m reading exceeds the noise threshold. (A ppm·m threshold is chosen for the noise level e.g. 2-sigma or 3-sigma.)

Identifying an area of the 2D data where ppm·m consistently exceeds the threshold (i.e. say >10 points exceed the threshold.

If found this area of the 2D data is classified as a likely leak location at operation 3 and used in the measurement of gas flow.

Figure 6:
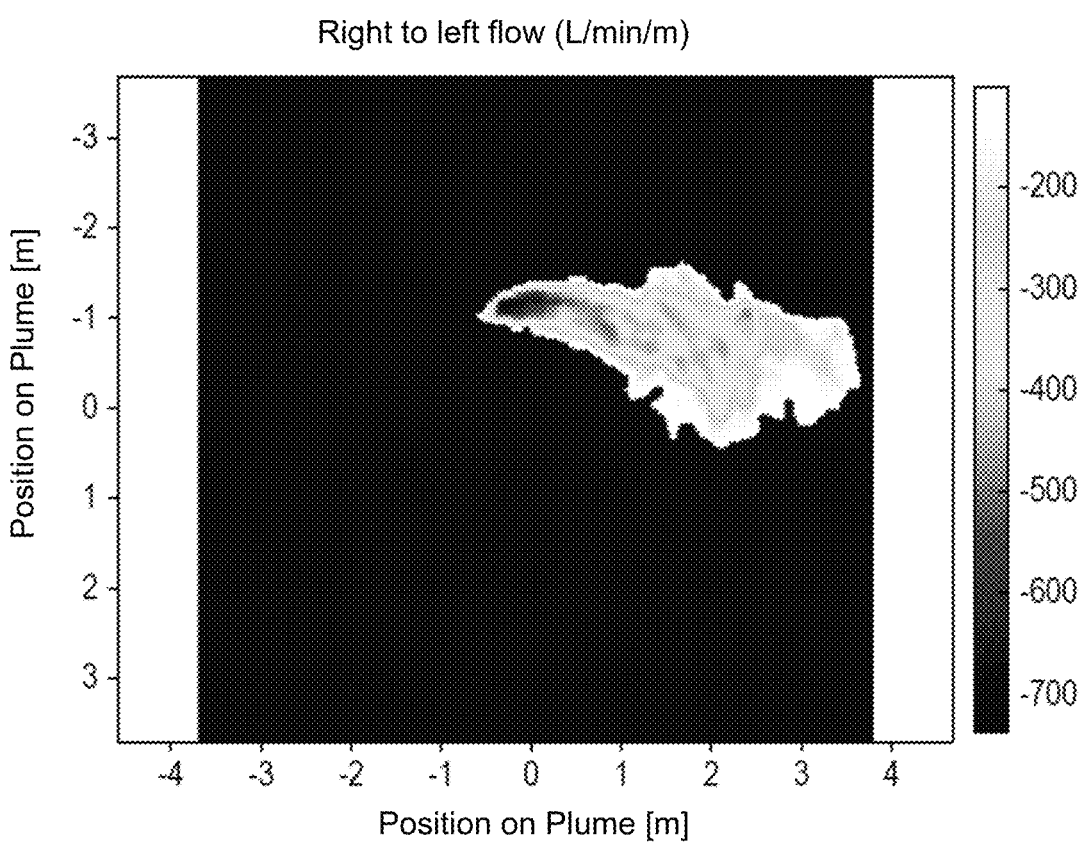
FIG. 6 shows a 2D image in which a gas plume has been isolated from background data.

At operation 4, a region of highest ppm·m, in the likely leak location is identified and isolated and assumed to correspond to a gas plume. This is illustrated in FIG. 6 which shows a 2D image in which a plume has isolated from ppm·m background data. The plume may be identified by thresholding the ppm·m image shown for example in FIG. 5A, for example deleting all data below a threshold such as 400 ppm·m, and then using a standard algorithm to find the largest contiguous region of gas containing the previously identified likely leak location, e.g. the area of the 2D data where ppm·m consistently exceeds the threshold.

This contiguous region, now isolated, is used in operation 5 to determine a 3D location for the source, or leak origin, from the 2D image information. This may be done by:

Finding Lidar ranges of all data points in the plume region (i.e. distance to reflector, e.g. surface of structure, other surface, other reflector, corresponding to each image data point).

Assuming the leak range (z) is assumed to be the shortest of the Lidar ranges in the plume region.

Now the leak x,y location (from 2D image) and the leak range, z have been determined to provide an estimate, or determination, of the leak position in 3D.

Figure 7A:
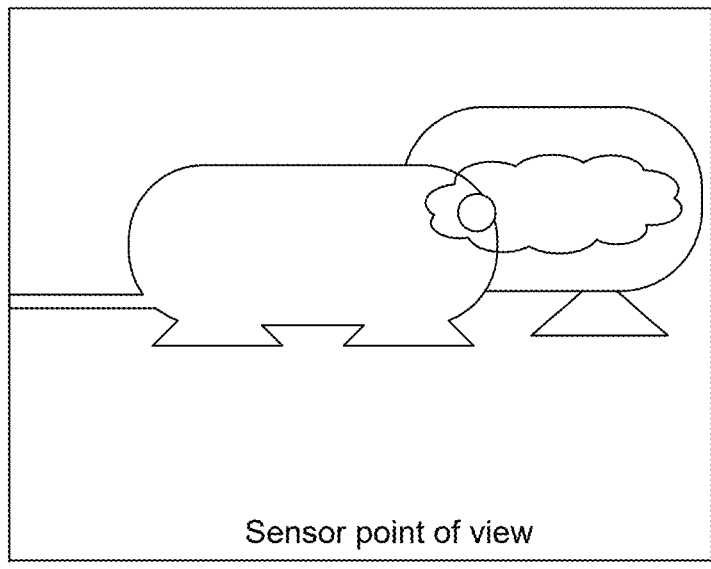
FIG. 7A and FIG. 7B are schematic diagrams showing an example of relative locations of a gas leak and a sensor.
Figure 7B:
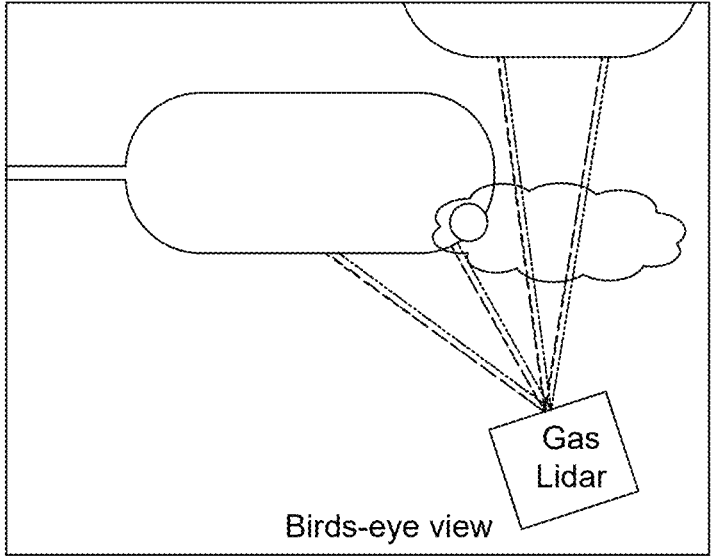

The determination of leak location is illustrated further in FIGS. 7A and 7B. FIG. 7A shows schematically a gas leak from a sensor point of view. FIG. 7B shows the same leak from a bird's eye, i.e. aerial, view including the sensor location. The sensor laser beam paths are shown as black arrows. The leak location may be inferred by finding the shortest beam path in the area of elevated gas ppm·m. The inferred leak location is shown as black circle. FIG. 7B shows that the laser beam (black arrows) only reflects off objects. It will go straight through the plume.

At operation 6, prevailing wind data is obtained in order to model the gas plume and for use in the flow rate determination. As noted above, this may be obtained for example from a third party source of meteorological information, or from an anemometer in the region, or from any other suitable source. The source of the prevailing wind data may be one or more sensors, which may for example be close or adjacent to the detected gas or structure in which it is contained, optionally not so close that the wind would be affected by solid structures from which gas might leak. The prevailing wind data will typically but not necessarily be applicable to a region including the detected location, and may simply comprise speed and direction. Alternatively in operation 6 the local wind data, discussed in connection with operation 9, may be used in order to model the gas plume. This could make the modelling more complex since the wind direction might be curved.

At operation 7 the prevailing wind direction and 3D leak origin are used to estimate size and trajectory of plume in 3D. For this, the plume may be assumed to be a thin planar sheet that extends from the leak origin in the direction of the prevailing wind. This is explained further with reference to FIG. 8.

A reasonable 3D model of the plume is desired for accurate flow rate estimation. This is because the size of the plume is proportional to the flow rate.

It is important to note that the laser radiation does not scatter off the plume. However the 3D position of the plume may be inferred from the 3D lidar map of objects, as shown for example in FIGS. 4A and 4B. The gas in the plume absorbs some of the wavelengths in the laser, creating the 'spectral dip' which is measured to infer the quantity of gas. In other words, some of the wavelengths in the beam are attenuated by the presence of gas, and this may be used to infer the 3D position of the gas plume.

Figure 8:
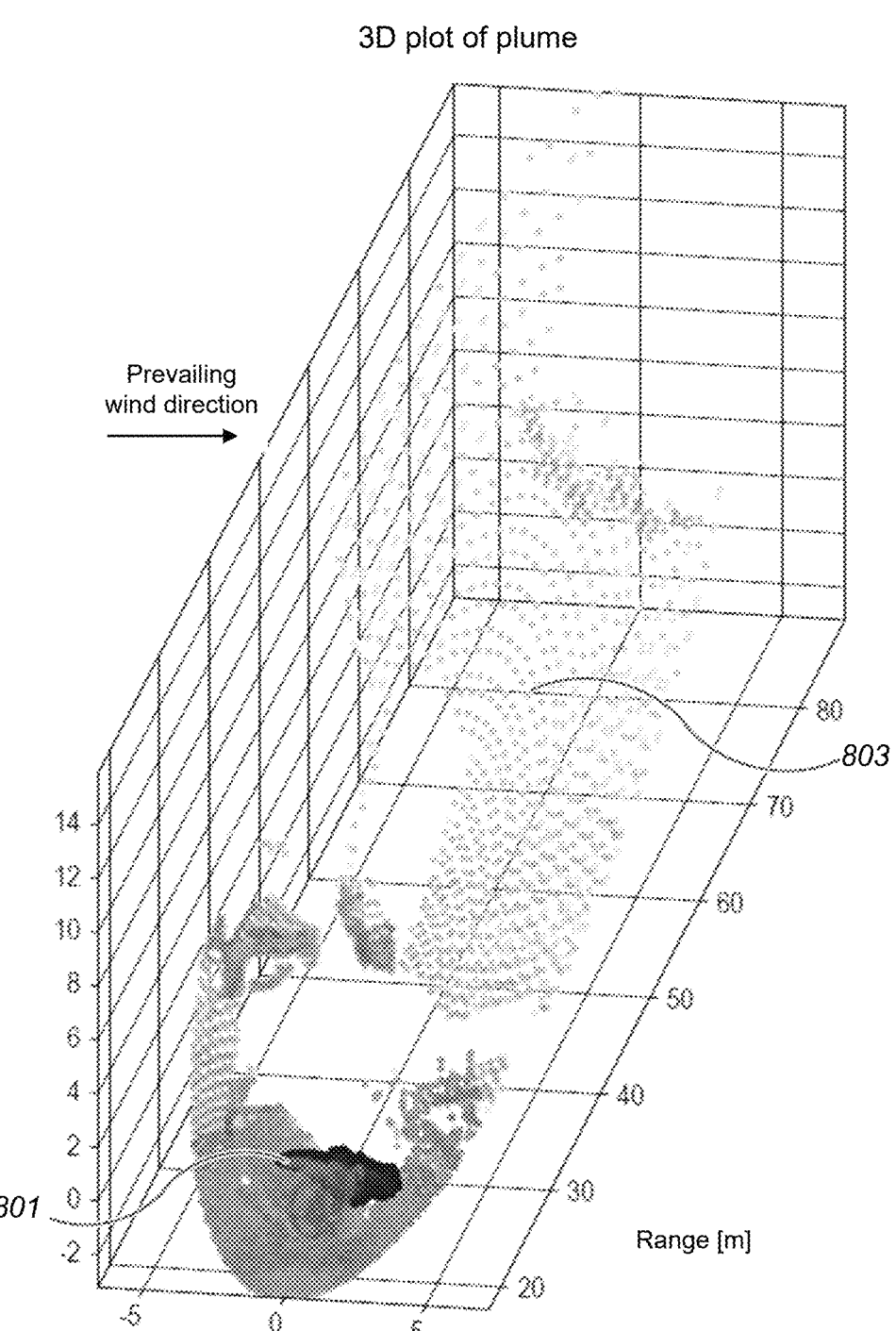
FIG. 8 shows a 3D graph showing predicted 3D location of a gas plume.

In FIG. 8, the predicted 3D location of plume is indicated by reference 801 and the 3D point cloud data by reference 803. The plume is modeled as a 2D plane parallel to the wind. i.e. there is no 'thickness' to the plume because that cannot be measured with the TDLidar. However, this is not important for the calculation.

The predicted 3D location of plume may be generated as follows:

It is assumed that the plume trajectory starts from leak 3D location, and follows the prevailing wind. The local wind as defined elsewhere here may be used for the predicted 3D location of the plume, but this would be more complex and it has been found sufficient to use the prevailing wind at this stage.

A 2D plane is defined parallel to the plume trajectory and perpendicular to the ground ppm·m data from the isolated plume (operation 4) is rasterized 2D plane to create the plume model shown in FIG. 8. For example, the ppm·m data may be received as a point cloud (i.e. 3D scatter plot) as is common for lidar systems. To form an image from the scatter plot a process called rasterization is used, where the points are 'binned' and averaged into a square 2D grid of pixels.

At operation 8, data obtained from the lidar apparatus 30 is used to create a 3D structure map of objects in the field of view of the apparatus. This may include areas of ground, pipelines, containers and other structures that may reflect the transmitted laser radiation, as explained with reference to FIG. 3 for example.

At operation 9, local wind data for the source or other location of the gas is determined based on the prevailing wind data and the lidar distance information. FIGS. 1 and 2 show two different methods by which this may be performed which are described further with reference to FIGS. 9A, 9B, and 10. These methods are not mutually exclusive and the local wind data may be determined using a combination of these methods, or the local wind data may be determined in other ways.

The lidar distance information used for the determination of local wind data may comprise the 3D map created at operation 8. Thus in operation 9 in FIGS. 1 and 2 the 3D map is used in the determination of local wind data.

In order to determine the local wind data, the prevailing wind data may be modified to take account of objects, detected by the lidar, that may obstruct the prevailing wind and/or the plume. For example, as shown in operation 9 of FIG. 1, if an object is obstructing the plume the prevailing wind may be altered to attenuate the wind component perpendicular to the obstruction. The alteration may be applied specifically in the region of the obstructing object.

It should be noted that the local wind data may correspond to the prevailing wind data. In other words, in any of the methods described here, it may be found that no structure is present that will affect the prevailing wind and/or the travel of the plume, and therefore it is not required to modify the prevailing wind data in order to determine the local wind data.

The alteration of the wind data, where performed, may use computational fluid dynamics "CFD" to model the wind around structures, as described with reference to FIGS. 2 and 10. However, improved estimations of fluid flow may be obtained with simple measures to take account of structures, as described with reference to FIGS. 1, 9A, and 9B.

Figure 9A:
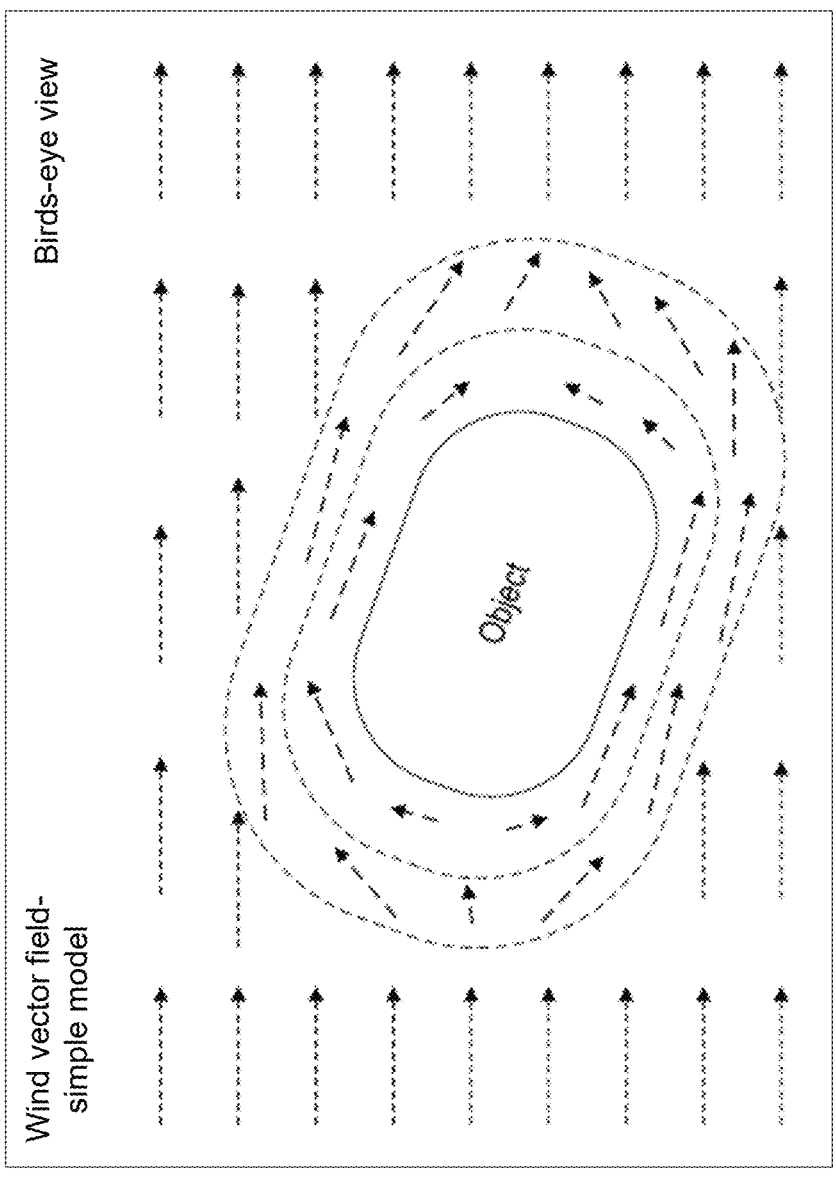
FIG. 9A and FIG. 9B are schematic diagrams showing an example of determination of local wind data from prevailing wind data.
Figure 9B:
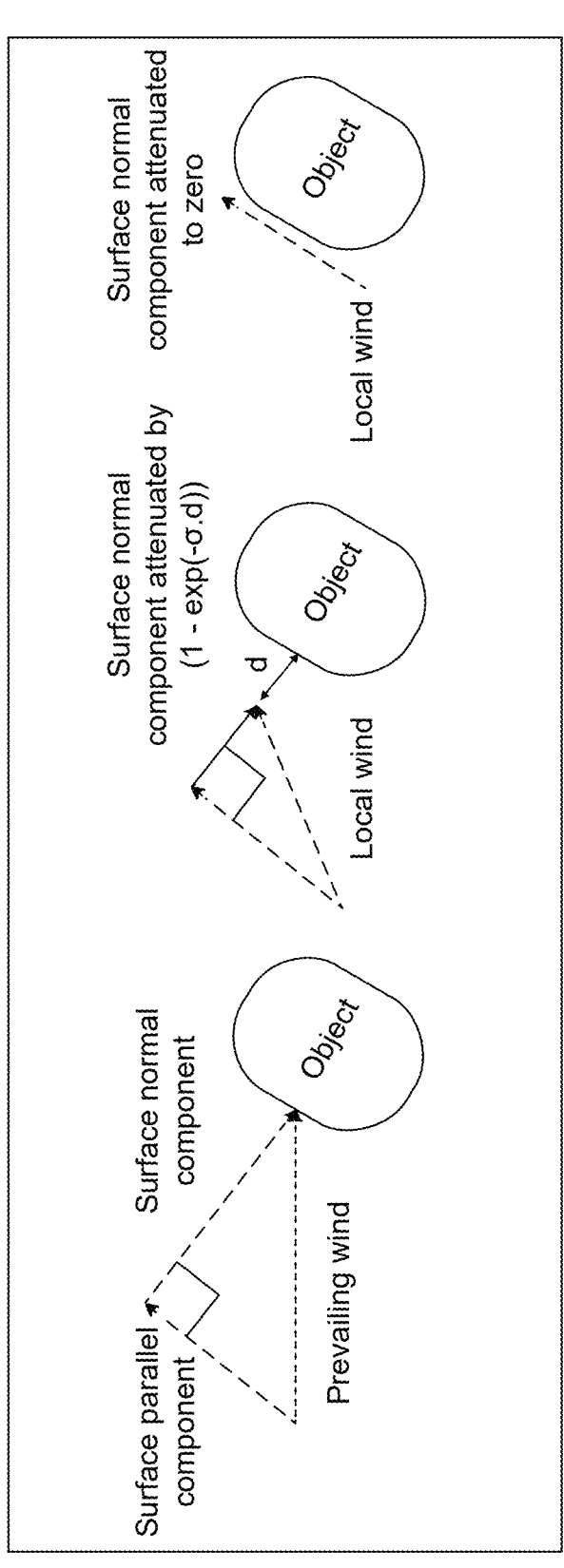
Figure 10:
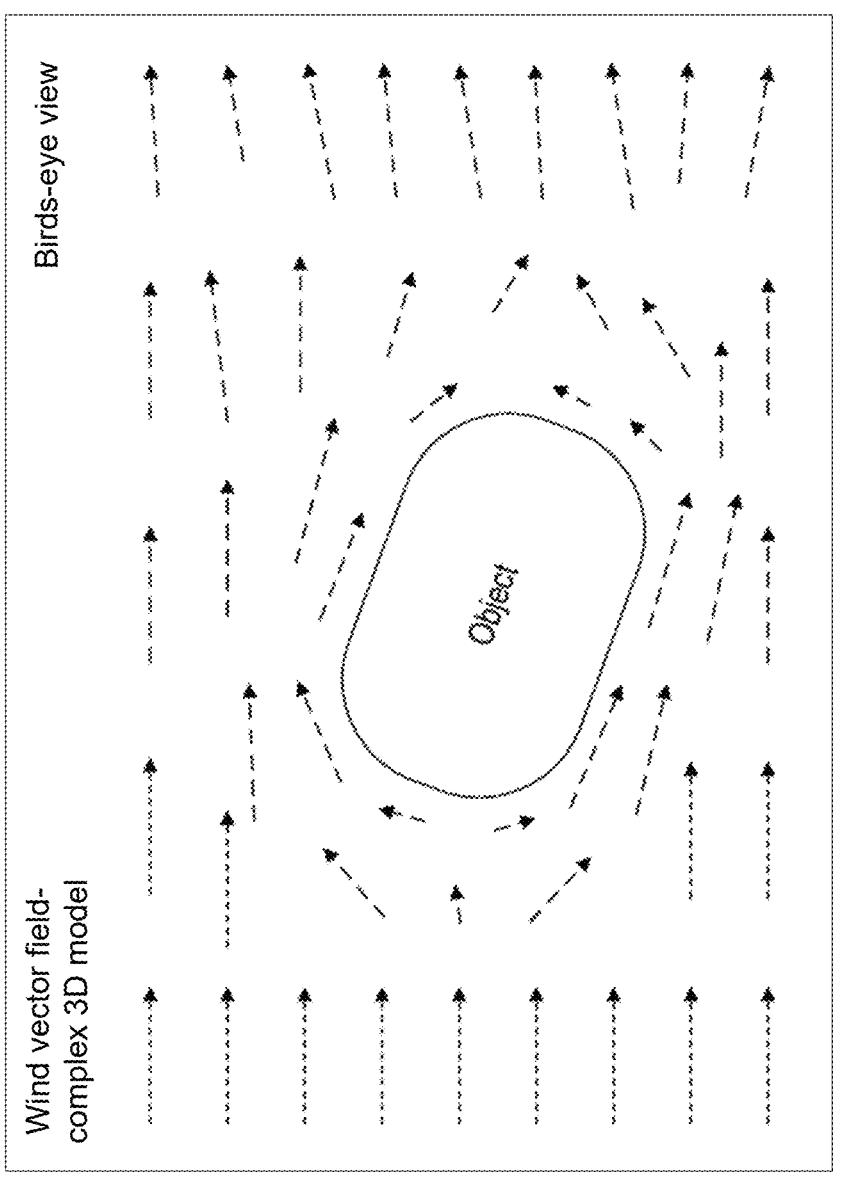
FIG. 10 is a schematic diagram showing an example of determination of local wind data from prevailing wind data.

Some schematic diagrams showing a simple example of how prevailing wind data may be modified are shown in FIGS. 9A and 9B. These show how a wind vector field could be computed using a highly simplified model. FIG. 9A is an aerial view showing wind flowing around a simple object. The prevailing wind data comprises a single vector in a left to right direction as illustrated. In this case, in the vicinity of objects, the wind vector field components perpendicular to the surface of the object may be attenuated as shown in FIG. 9A by the differently dashed slanting arrows. For curved surfaces the wind vector field components perpendicular to the tangent of the curved surface may be attenuated. Therefore, local wind data may be determined from the prevailing wind data by attenuating components of the prevailing wind perpendicular to a surface of a structure.

FIG. 9B shows that the prevailing wind vector may be divided into two components, perpendicular and parallel to the nearest surface of the object. The wind vector is then attenuated by scaling the normal component n of the prevailing wind. The normal component n can for example be scaled by a function depending on distance d to the surface (e.g. $1-\exp(-\text{sigma}\cdot d)$), where sigma is a rate of decay of the perpendicular wind component closer to the structure. So that for d=0 the normal component is 0, while for d→large the normal component is 1. In the simplest example, this modification of the prevailing wind may ensure that the local wind vector does not include wind emanating from a flat wall.

In this example, no complex CFD calculations are required in order to estimate the local wind data and hence gas flow rate more accurately than would be possible without taking account of such structures. In a practical implementation, several structures and/or structures with complex surfaces may be present. Then, the extent to which the prevailing wind data is modified to determine the local wind data may be decided depending on the measurement accuracy required. For example, it may be sufficient in some instances to select one major surface of a detected structure on which to base a modification of the prevailing wind data. In all instances the extent to which the prevailing wind data is modified to determine the local wind data may depend on the prevailing wind velocity.

In FIG. 2, at operation 9, the lidar distance information, in the form of the 3D structure obtained at operation 8 is combined with the prevailing wind and a CFD model to predict local wind data in the form of a local wind vector field which may then be used at operation 10 to determine flow rate. This is illustrated schematically in FIGS. 10, 11A and 11B.

Figure 11B:
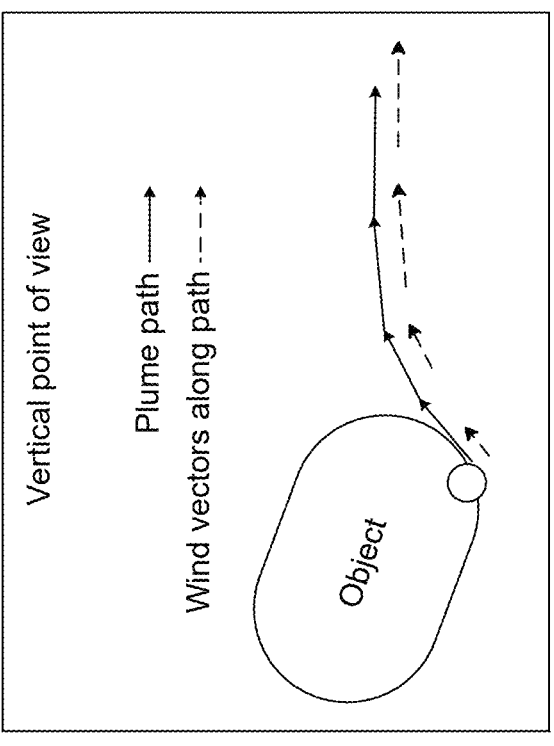
FIG. 11B is a vertical-point-of-view schematic of how the gas leak data is combined with the local wind data.
Figure 11A:
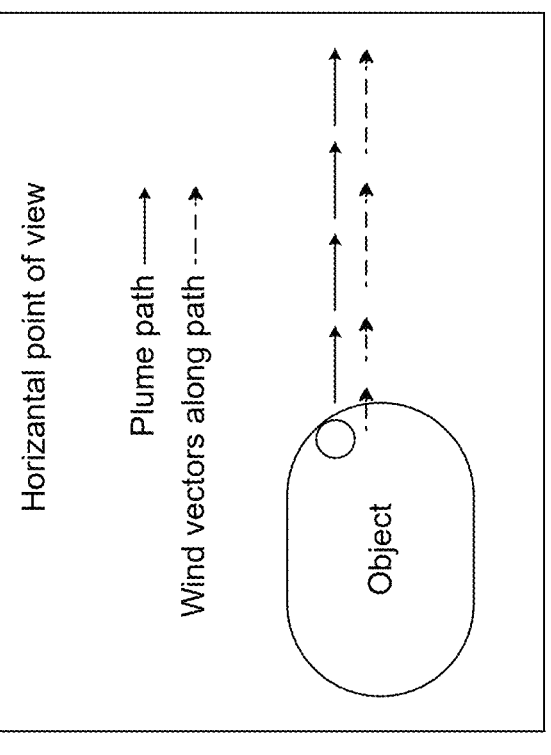
FIG. 11A is a horizontal-point-of-view schematic of how the gas leak data is combined with the local wind data.

As with the example of FIGS. 9A and 9B, the prevailing wind may be measured by anemometer or provided by local met service or other suitable source. The dotted arrows represent local wind vectors (direction and magnitude) such as may be calculated by a fluid dynamics model. In FIG. 10 wind vectors around the whole structure are indicated. FIGS. 11A and 11B show horizontal-point-of-view and vertical-point-of-view selections, respectively, of wind vectors and the plume path. In FIGS. 11A and 11B, the encircled white dot indicates the predicted origin of the plume, while the black arrow shows the direction the plume is assumed to flow in (along the prevailing wind). The plume path may be predicted based on the estimated plume location and prevailing wind direction. The local wind vectors at each point along the direction of the plume may be used in the determination of flow rate.

In principle, the prevailing wind data may be acquired at any suitable frequency. As noted previously the acquisition period for gas concentration pathlength data may be 100 seconds or more and therefore it may be suitable to acquire the local wind data and to determine the local wind data at least once for every data acquisition period. During this time the prevailing wind data may vary. Therefore, in some implementations, the local wind data may be determined at multiple instances during the data acquisition period by acquiring the prevailing wind data for each instance. Additionally or alternatively, the rate of flow of gas may be determined using only gas concentration pathlength measurements obtained when the local wind vector satisfies predetermined criteria. For example, the local wind data may be determined at multiple instances during the acquisition period and used to determine constant local wind data, e.g. a constant wind vector, for the acquisition period. Then measurements taken when the local wind data is beyond a preset range of the constant wind data may be discarded. The constant wind data may be based on an average of the measured data for example.

Figure 12A:
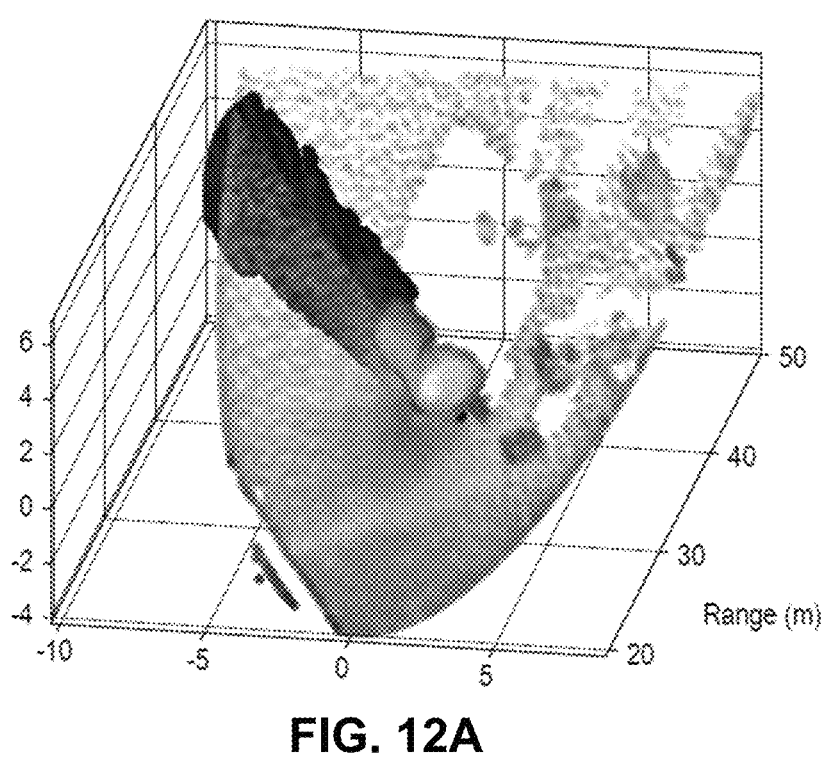
FIG. 12A and FIG. 12B show respectively an example 3D gas concentration image and a graph showing the calculation of gas leak rate by the integration of the gas concentration data.

At operation 10 the simple 3D model of the gas plume that was in a plane in the direction of the prevailing wind is modified to follow the direction of the local wind field calculated and modelled in operation 9. FIG. 12A shows a schematic of how this may be done. The gas plume model remains a sheet but this now follows the local wind direction rather than the prevailing wind direction and therefore no longer runs into or through the lidar identified solid objects.

At operation 11 the flow rate is determined by multiplying the local gas concentration pathlength at each point in the plume sheet by the local wind speed at that point and integrating the combined gas concentration x wind speed determined in operation 10 through planes perpendicular to the local wind direction.

One possible method for determining flow rate will now be described. Others will be familiar to those skilled in the art. This method uses the following inputs to output leak location (e.g. GPS) and gas leak flow rate (grams/second or other suitable units):

Image of gas in units of concentration pathlength (ppm·m) across a 2 dimensional field of imagers angles (degrees)

Image of lidar distance to solid objects (m) across the same 2 dimensional field of imager angles (degrees)

TDlidar apparatus imager field of view (FOV) diameter (degrees) (Note: FOV will depend on the scanner zoom)

Horizontal direction imager is pointing (degrees east of north or some other standard)

Vertical direction of imager (degrees down from horizontal)—this information may be obtained for example from a tilt stage supporting the imager or an internal sensor.

Prevailing wind speed (m/s)

Prevailing horizontal direction wind is coming (degrees east of north or some other standard)—as noted above this information may be obtained from a third party source such as a meteorological office or anemometer in the region including the location of the source of the gas.

A method of determining gas flow rate may comprise the following:

Identifying the Leak Location by the highest methane concentration area in the gas image, for example as shown in FIG. 5A.

Determining the leak location distance (D) from the lidar image (for example as shown in FIG. 7B).

Modelling in 3 dimensions the gas as a thin 2-dimensional vertical plane where the highest concentration area identified above is located at the leak distance (D) and the plane extends from there in the prevailing wind direction. The dimensions of the gas field are calibrated from the imager angle (degrees) into vertical dimension (m) by multiplying by the distance from the imager to the plane of the gas plume.

Modelling in 3 dimensions the local wind speed and direction around the solid objects identified by the lidar that are nearby to the modelled plane of gas.

Modifying the 3-dimensional gas plume model so that the gas is a thin sheet that is anchored at the leak location as determined above but now follows the local wind directions, not the prevailing wind direction.

Multiplying the local gas concentration path length (ppm·m) at each point in the model by the gas density (g/ppm/m$^3$) and local wind velocity (m/s) and multiplying by the sine of the angle between the laser imager beam and the local wind direction (and so by a factor of 1 if they are perpendicular) at each point to derive a 2-dimensional field of points with units g/m/s.

Figure 12B:
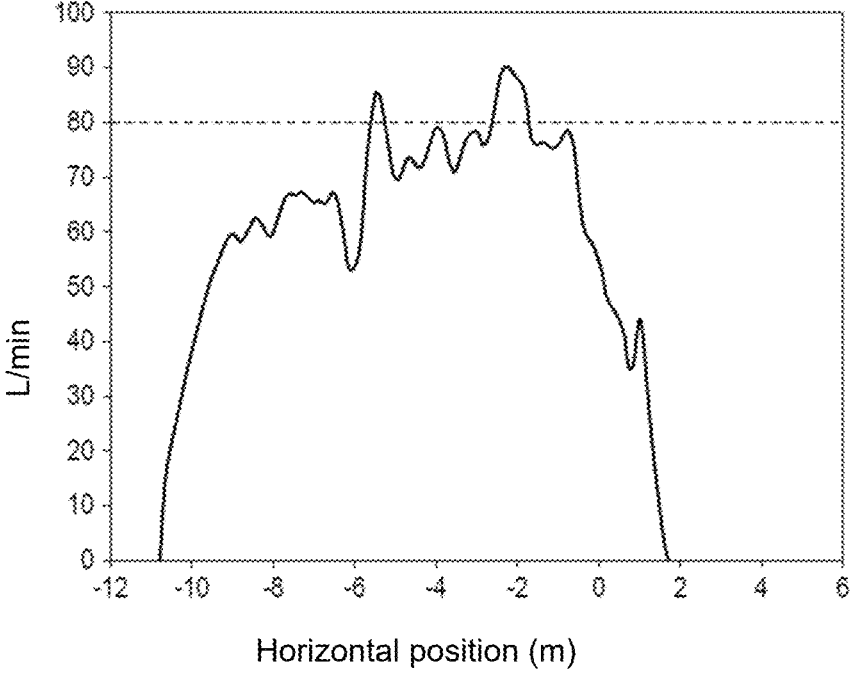

Integrating this field in vertical lines across the plume to derive a series of measurements of the gas leak flow rate in the plume with units of g/s down the direction of the local wind as shown in FIG. 12B.

Taking the maximum of these as the best measurement of Gas Leak Flow Rate.

A gas lidar camera or sensor suitable for use in measuring gas leak flow rate in the methods described here will now be briefly described with reference to FIGS. 13 and 14. Further details of the operation of such a camera for gas detection may be found in GB2586075A.

Figure 13:
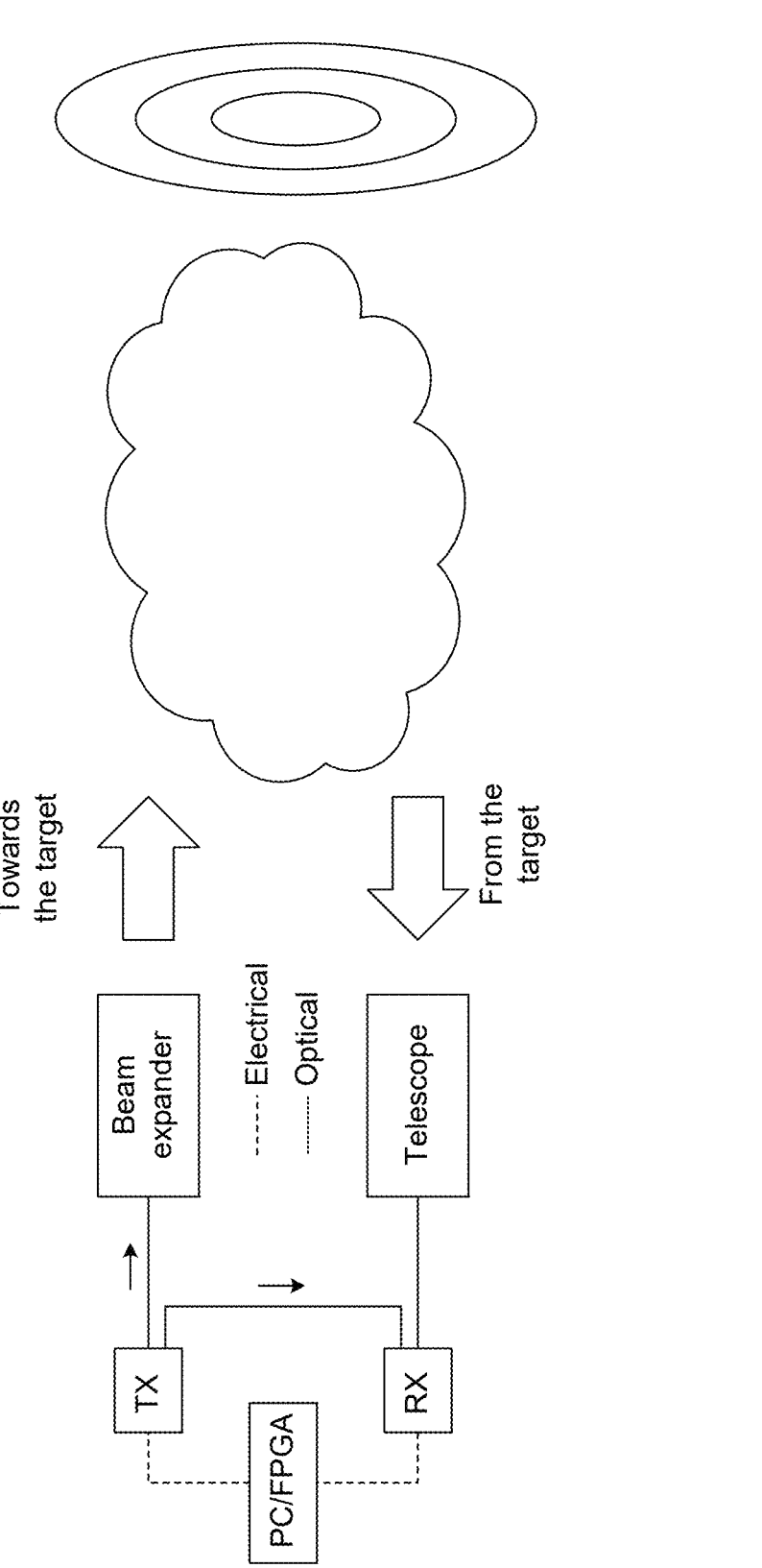
FIG. 13 is a schematic diagram of the basic architecture of a lidar system comprising a gas lidar sensor.

The basic architecture of a lidar system is depicted in FIG. 13 where TX indicates a laser transmitter, RX an optical receiver, PC: personal computer, FPGA: Field Programmable Gate Array. The laser transmitter (TX) works either in Continuous Wave (CW), pulsed condition, or under modulation, and the beam is launched through a lens system, beam expander or telescope. The reflected signal is detected by the receiver (RX), and electronically processed to derive the distance to the target and other information. Depending on the system, the RX may also use a fraction of the emitted light as reference or as local oscillator to beat against the returned signal on the detector. In other possible implementations a local oscillator is not required. The laser may be a distributed feedback (DFB) laser as is known in the art.

The original lidar distance measurement has been extended to measure many new parameters including the velocity of remote objects, the quantity and type of gas the laser passes through, and the velocity of the air.

In the methods described here, a lidar system is used to make distance measurements to structures in an environment in which a leak of a particular gas may occur, as well as to detect the gas itself. Data acquired by the lidar system may be processed in the system or remotely and combined with wind vector measurements to more accurately calculate the total gas mass flow rate of the leak.

Single photon lidar is a very active field with multiple research groups working on long distance measurement. Geiger-mode single-photon lidar systems, originally developed by MIT Lincoln Laboratories have been made commercially available and used for satellite observations of the Earth's surface. For example, Zheng-Ping Li et al, Single Photon imaging over 200 km, Optica Vol. 8, No. 3 p 344 March 2021, present a single photon lidar system that uses "optimized compact coaxial transceiver optics". The transceiver is the optical system that transmits the lidar beam out of the laser source into the environment and then receives the scattered return light back from the environment and directs it into the single photon detector.

It should be noted that although light is referred to here, the methods and systems described are not limited to visible light and are applicable to other wavelength radiation.

Figure 14:
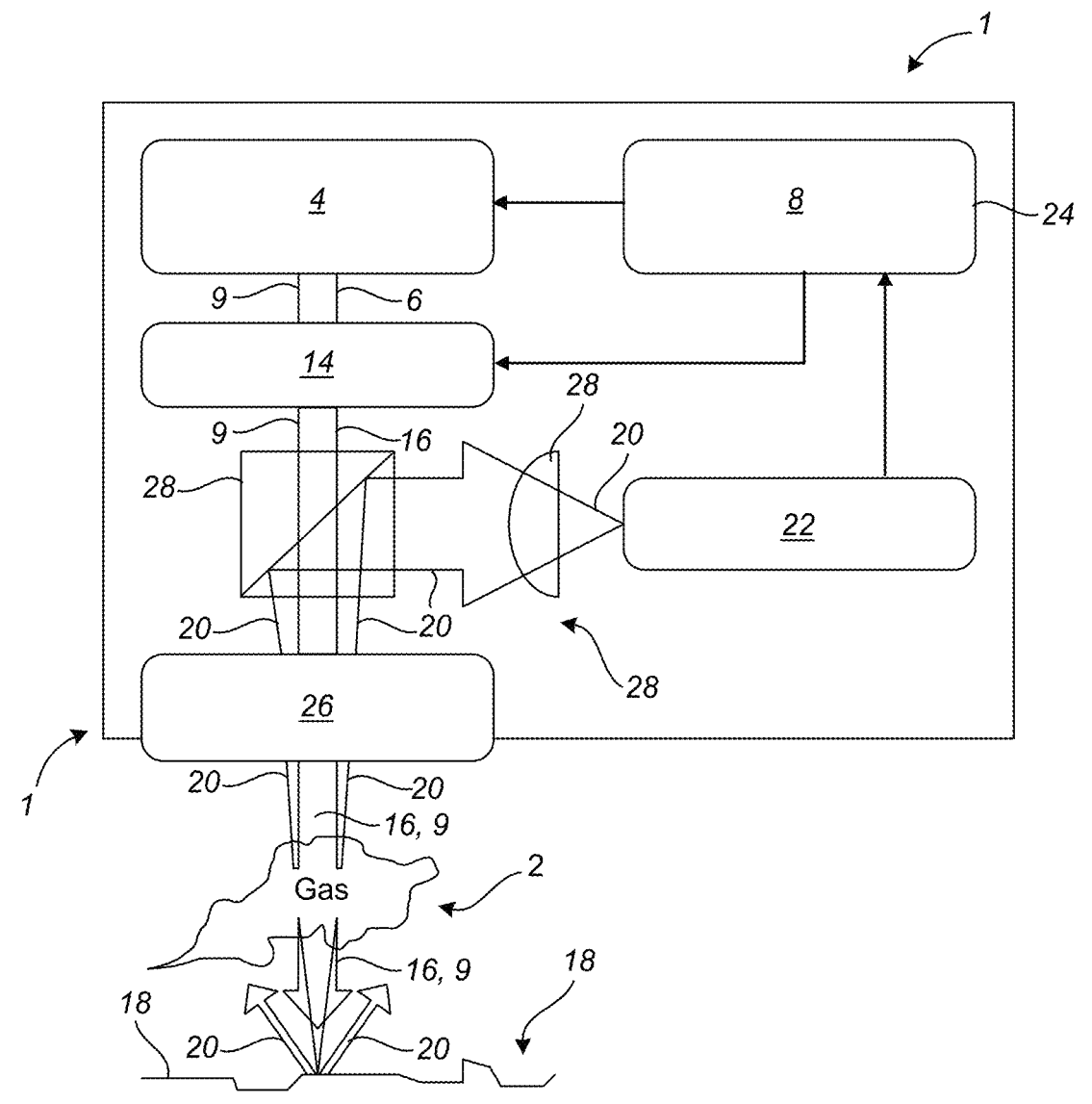
FIG. 14 is a schematic diagram of a single photon lidar system.

FIG. 14 is a schematic diagram of a single photon lidar system, described in further detail in GB2586075A as an optical gas detection device. The gas detection device is configured to detect the presence or concentration of at least one gas 2.

In the system of FIG. 14, a laser device 4 is operable to output first output radiation 6 having a continuous wave output. A control element 8 is operable to tune a first emission wavelength 9 of the first output radiation 6 continuously within a first wavelength spectrum to allow for fast scanning of an environment whilst reducing the spectral coherence of the transmitted radiation of the optical device 1. The laser device may comprise a TDLAS device but other laser devices may be used in the methods described here.

As shown, the device 1 includes a modulator 14 operable to apply a first output modulation 16 to the first output radiation 6. Further, the device 1 includes an optical transceiver system 26 operable to transmit the first output radiation 6 towards a first target location or area 18 and to collect/receive scattered radiation 20, the scattered radiation 20 having been at least partially modified by the gas 2 present in the first target location 18. A detector 22 is configured with one or more optical guide elements 28 such as a beamsplitter and a focusing lens to receive the scattered radiation 20, and a processing element 24 is operable to process the received scattered radiation 20. The detector 22 may comprise a single photon lidar sensor as is known in the art.

The control element 8 and the processing element 24 may be comprised in a computer or computing system which may be part of the device 1. The processing element may comprise a FPGA. Alternatively components of the device may be controlled from a computer or computing system remote from the device itself.

GB2586075A discloses a gas sensor using a combination of two laser technologies known as Single Photon LiDAR and Tuneable Diode Laser Absorption Spectroscopy (TD-LAS) designed to provide a fast, accurate leak identification, quantification, and mapping system to meet the commercial needs of oil and gas producers for high-speed sensing and large survey coverage area at a small fraction of the operational costs of their existing solutions. A sensor of this type may use a rapidly tuned (>100 kHz) diode laser using direct current modulation. In other words the frequency at which the gas spectrum is traversed is greater than 100 kHz. In a system currently being implemented, 1 pixel is obtained for each 10 μs and therefore there are 10,000 wavelength tuning scans to obtain a single pixel. The modulation scheme does not necessarily require the light wavelength to be tuned since different sources may be used to emit light of different wavelengths. For example, DFB lasers can be set to emit custom wavelengths. So an array of different DFB lasers could be used to generate the range of wavelengths required. Further, where a tuned source is used, no particular tuning frequency is required.

Some operations of the methods described herein may be performed by software in machine readable form e.g. in the form of a computer program comprising computer program code. Thus some aspects of the invention provide a computer readable medium which when implemented in a computing system cause the system to perform some or all of the operations of any of the methods described herein. The computer readable medium may be in transitory or tangible (or non-transitory) form such as storage media include disks, thumb drives, memory cards etc. The software can be suitable for execution on a parallel processor or a serial processor such that the method steps may be carried out in any suitable order, or simultaneously.

Figure 15:
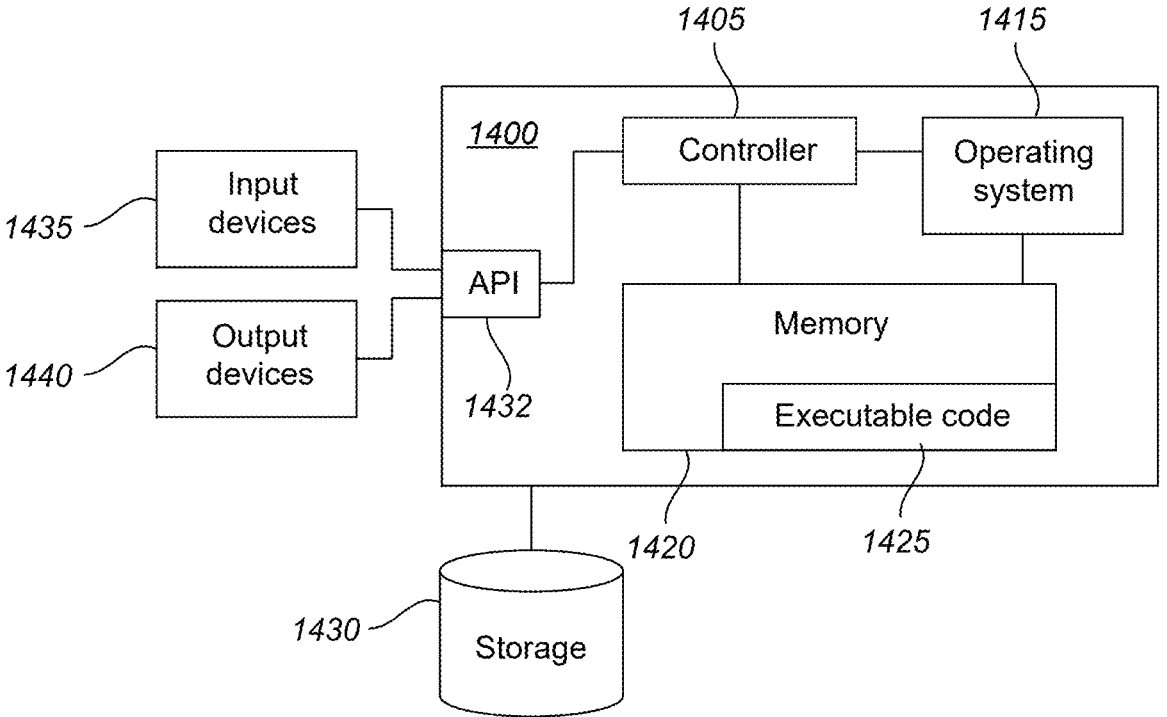
FIG. 15 is a schematic diagram of a computing system which may be used in the implementation of any of the methods described here.

A computing system which may be used in the implementation of any of the methods described here is shown schematically in FIG. 15.

Computing system 1400 may comprise a single computing device or components such as a laptop, tablet, desktop or other computing device. Alternatively functions of system 1400 may be distributed across multiple computing devices. Some or all of the computing system components may be incorporated in the system of FIG. 13.

Computing system 1400 may include one or more controllers such as controller 1405 that may be, for example, a central processing unit processor (CPU), a chip or any suitable processor or computing or computational device such as the FPGA mentioned above, an operating system 1415, a memory 1420 storing executable code 1425, storage 1430 which may be external to the system or embedded in memory 1420, and an API 1432 connecting to one or more input devices 1435 and one or more output devices 1440.

One or more processors in one or more controllers such as controller 1405 may be configured to carry out any of the methods described here. For example, one or more processors within controller 1405 may be connected to memory 1420 storing software or instructions that, when executed by the one or more processors, cause the one or more processors to carry out a method according to some embodiments of the present invention. Controller 1405 or a central processing unit within controller 1405 may be configured, for example, using instructions stored in memory 1420, to perform some of the operations shown in FIGS. 1 and 2.

Lidar sensor data received at operation 1 of FIGS. 1 and 2 may be received at a processor comprised in the controller 1405 which then controls the subsequent operations of FIGS. 1 and 2 according to one or more algorithms which may be stored as part of the executable code 1425.

Input devices 1435 may be or may include a mouse, a keyboard, a touch screen or pad or any suitable input device. It will be recognized that any suitable number of input devices may be operatively connected to computing system 1400 as shown by block 1435. Output devices 1440 may include one or more displays, speakers and/or any other suitable output devices. It will be recognized that any suitable number of output devices may be operatively connected to computing system 1400 as shown by block 1440. The input and output devices may for example be used to enable a user to select information, e.g. images and graphs as shown here, to be displayed.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The embodiments described above are largely automated. In some examples a user or operator of the system may manually instruct some steps of the method to be carried out.

In the described embodiments of the invention the system may be implemented as any form of a computing and/or electronic system as noted elsewhere herein. Such a device may comprise one or more processors which may be microprocessors, controllers or any other suitable type of processors for processing computer executable instructions to control the operation of the device in order to gather and record routing information.

The term "computing system" is used herein to refer to any device with processing capability such that it can execute instructions. Those skilled in the art will realise that such processing capabilities may be incorporated into many different devices and therefore the term "computing system" includes PCs, servers, smart mobile telephones, personal digital assistants and many other devices.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item or "piece" refers to one or more of those items unless otherwise stated. The term "comprising" is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples.

Various aspects (X1-X17) of different embodiments of the present invention are also expressed below:

X1. A method of detecting and measuring a gas flow, the method comprising:
    using a lidar sensor to obtain gas detection data and distance information relating to solid structures in the sensor field of view;
    determining a location of the detected gas;
    acquiring prevailing wind data for the location of the detected gas;
    determining local wind data for the location of the detected gas based on the prevailing wind data and the lidar distance information; and
    determining the rate of flow of the gas from the source using the lidar gas detection data and the local wind data.

X2. A method of detecting and measuring a gas flow, the method comprising:
    receiving gas detection data from a lidar sensor, wherein the data includes distance information relating to solid structures in the sensor field of view;
    determining a location of the detected gas;
    receiving prevailing wind data for the location of the detected gas;
    determining local wind data for the location of the detected gas based on the prevailing wind data and the lidar distance information; and
    determining the rate of flow of the gas using the lidar gas detection data and the local wind data.

X3. The method of aspects X1 or X2, comprising using the lidar distance information and the prevailing wind data to identify objects in the sensor field of view obstructing the flow of gas,
    wherein determining local wind data comprises modifying the prevailing wind data to account for the identified objects.

X4. The method of aspects X1, X2 or X3, wherein the local wind data is determined by attenuating one or more components of the prevailing wind data perpendicular to a surface of a structure.

X5. The method of aspect X3, wherein the lidar distance information is combined with the prevailing wind data and a computational flow dynamics model to predict local wind data for use in the determination of the rate of flow of the gas.

X6. The method of any of the preceding aspects X1-X5, wherein:

the obtaining gas detection data and obtaining distance information are repeated in successive data acquisition periods, the local wind data is determined at multiple instances during a data acquisition period, and the multiple measurements are used to determine constant local wind data for the acquisition period.

X7. The method of any of the preceding aspects X1-X6, comprising:

determining gas concentration pathlengths for points in the sensor field of view based on the lidar gas detection data and distance information, wherein the determining the rate of flow of gas comprises multiplying gas concentration path length by the local wind data, wherein:

the rate of flow of gas is determined using only gas concentration path length measurements obtained when the local wind data satisfies predetermined criteria.

X8. The method of any of the preceding aspects X1-X7, wherein the lidar sensor is scanned over the sensor field of view during a data acquisition period and wherein for different points in the field of view multiple gas concentration measurements are obtained.

X9. The method of any of the preceding aspects X1-X8, comprising determining gas concentration pathlengths for points in the sensor field of view based on the lidar gas detection data and distance information.

X10. The method of any of the preceding aspects X1-X9, wherein determining a location of the detected gas comprises determining a location of a source of the detected gas.

X11. The method of aspect X10, when dependent on aspect X9, wherein the location of the source of the gas is determined from the gas concentration path length data.

X12. The method of aspect X11, wherein determining the location of the source of the gas comprises identifying an area of the sensor field of view in which gas concentration pathlength exceeds a threshold and determining the leak location from the sensor location and the lidar range from the sensor to the area.

X13. The method of aspect X12, wherein the determining the leak location comprises overlaying a gas concentration pathlength image over a signal level image to indicate the location of the gas leak.

X14. The method of any of the preceding aspects X1-X13, wherein the lidar distance information is used to create a 3D map of structures in the field of view of the lidar sensor and wherein the 3D map is used in the determining of local wind data.

X15. The method of any of the preceding aspects X1-X14, wherein the prevailing wind data is acquired using an anemometer which is co-located with the lidar sensor.

X16. A computer readable medium comprising instructions which, when implemented in a processor in a computing system, cause the system to perform a method according to aspect X2 or any aspect dependent from aspect X2.

X17. A system for detecting and measuring a gas flow according to the method of any of the preceding aspects X1-X16, the system comprising a computing system and a gas lidar sensor, wherein the computing system comprises one or more processors configured to perform a method according to aspect X2 or any aspect dependent from aspect X2.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A method comprising:

transmitting modulated diode laser light into a field of view;

receiving data from a lidar detector, wherein the received data corresponds to modulated diode laser light that has been scattered from structures in the field of view;

determining, from the received data, information relating to a gas concentration for a detected gas;

determining, from the received data, lidar distance information relating to the structures in the field of view;

determining local wind data for a location of the detected gas; and determining a rate of flow of the detected gas using the information relating to the gas concentration and the local wind data.

2. The method of claim 1, wherein the detected gas is methane.

3. The method of claim 1, comprising:

receiving prevailing wind data for the location of the detected gas; and wherein determining the local wind data for the location of the detected gas is based, at least in part, on the lidar distance information and the prevailing wind data.

4. The method of claim 3, comprising:

identifying objects in the field of view obstructing the flow of gas based, at least in part, on the lidar distance information and the prevailing wind data, and wherein determining local wind data comprises modifying the prevailing wind data to account for the identified objects.

5. The method of claim 3, comprising:

determining local wind data for use in the determination of the rate of flow of the detected gas based, at least in part, on the lidar distance information, the prevailing wind data, and a computational fluid dynamics model.

6. The method of claim 3, wherein the prevailing wind data is acquired using an anemometer which is co-located with the lidar detector.

7. The method of claim 1, wherein the determining of the information relating to the gas concentration and the determining of the lidar distance information are repeated in successive data acquisition periods, wherein the local wind data is determined at multiple instances during a data acquisition period, and wherein results of the determination of the local wind data at multiple instances are used to determine constant local wind data for the data acquisition period.

8. The method of claim 1, comprising:

determining gas concentration pathlengths for points in the field of view based, at least in part, on the information relating to the gas concentration and the lidar distance information, wherein the determining the rate of flow of the detected gas comprises multiplying gas concentration pathlength by the local wind data, and wherein the rate of flow of the detected gas is determined using gas concentration pathlength determinations obtained when the local wind data satisfies predetermined criteria.

9. The method of claim 1, wherein the modulated diode laser light is scanned over the field of view during a data acquisition period, and wherein the information relating to the gas concentration of the detected gas comprises multiple measurements for gas concentration for different points in the field of view.

10. The method of claim 1, wherein the determining of the location of the detected gas comprises determining a location of a source of the detected gas.

11. The method of claim 1, comprising:

determining gas concentration pathlengths for points in the field of view based on the information relating to the gas concentration and the lidar distance information.

12. The method of claim 1, wherein the lidar distance information is used to create a 3D map of structures in the field of view of the lidar detector, and wherein the 3D map is used in the determining of local wind data.

13. The method of claim 1, wherein the modulated diode laser light comprises output radiation from a continuous wave (CW) diode laser, and the output radiation is modulated by applying amplitude modulation from a modulator to the output radiation.

14. The method of claim 13, wherein the output radiation is modulated with a binary code.

15. A gas detection system comprising:

a lidar sensor comprising a tunable diode laser, a modulator, and a lidar detector;

at least one processor configured to perform operations comprising:

transmitting modulated diode laser light into a field of view;

receiving data from the lidar detector, wherein the received data corresponds to modulated diode laser light that has been scattered from structures in the field of view;

determining, from the received data, information relating to a gas concentration for a detected gas;

determining, from the received data, lidar distance information relating to the structures in the field of view;

determining local wind data for a location of the detected gas; and determining a rate of flow of the detected gas using the information relating to the gas concentration and the local wind data.

16. The gas detection system of claim 15, wherein:

the tunable diode laser is a distributed feedback laser, the lidar detector is a single-photon detector, and the detected gas is methane.

17. A method comprising:

receiving gas detection data from a lidar sensor having a field of view, receiving distance information relating to structures within the field of view;

determining a location for a detected gas based on the received gas detection data;

receiving prevailing wind data for the location of the detected gas;

determining local wind data for the location of the detected gas based on the prevailing wind data and the received distance information;

determining a flow rate of the detected gas based on the received gas detection data and the local wind data;

determining a gas concentration pathlength for one or more points in the field of view based on the received gas detection data and the received distance information, the gas concentration pathlength being gas concentration integrated along a laser beam path from the lidar sensor to a scattering object;

wherein determining a location of the detected gas comprises determining a location of a source of the detected gas;

wherein the location of the source of the detected gas is determined based on the determined gas concentration pathlength; and wherein the location of the source of the detected gas is determined based on a location of the lidar sensor and a lidar range from the lidar sensor to an area of the field of view in which the gas concentration pathlength exceeds a threshold.

18. The method of claim 17, comprising:

identifying objects in the lidar sensor field of view that obstruct airflow based on using lidar range information and the prevailing wind data;

wherein determining the local wind data comprises modifying the prevailing wind data based on the identified objects; and wherein the lidar range information is combined with prevailing wind data and a computational fluid dynamics model to determine the local wind data used for determining the flow rate of the detected gas.

19. The method of claim 17, comprising:

determining the flow rate of the detected gas based on multiplying the gas concentration pathlength by local wind data; and wherein the flow rate of the detected gas is determined using gas concentration path length measurements obtained when the local wind data meets a predetermined criterion.

20. The method of claim 17, wherein obtaining the gas detection data and obtaining the distance information are repeated in successive data acquisition periods;

wherein the local wind data is determined based on data collected at multiple points in time during a data acquisition period; and wherein the local wind data determined at multiple instances during a data acquisition period is used to determine constant local wind data for the data acquisition period.

* * * * *